Oct. 23, 1962 — A. W. GARDES — 3,060,289
OPERATING MEANS FOR CIRCUIT CONTROLLER AND THE LIKE
Filed Nov. 23, 1959 — 13 Sheets-Sheet 1
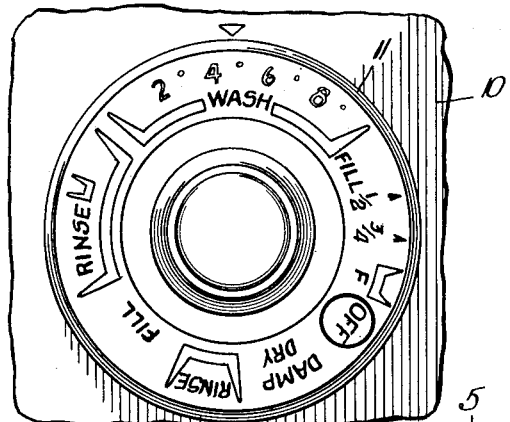
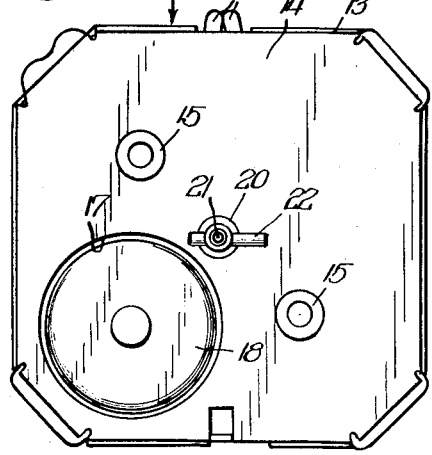
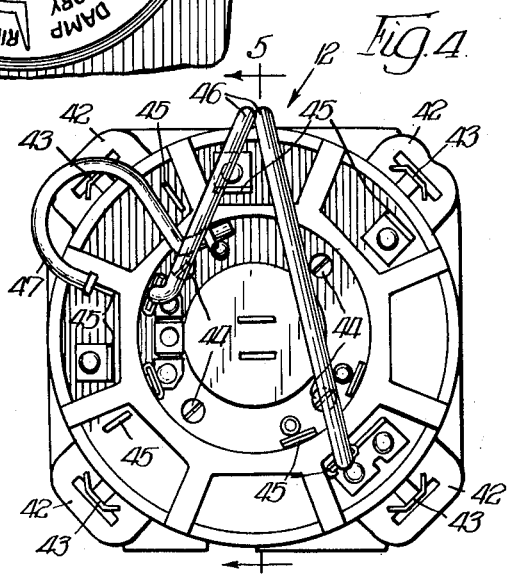
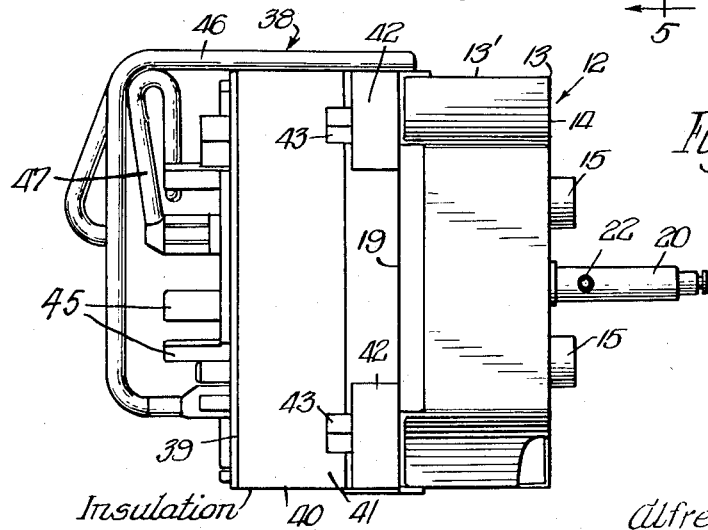
Inventor:
Alfred W. Gardes,
By Robert R. Lockwood
atty.

Oct. 23, 1962  A. W. GARDES  3,060,289
OPERATING MEANS FOR CIRCUIT CONTROLLER AND THE LIKE
Filed Nov. 23, 1959  13 Sheets-Sheet 2

Oct. 23, 1962 A. W. GARDES 3,060,289
OPERATING MEANS FOR CIRCUIT CONTROLLER AND THE LIKE
Filed Nov. 23, 1959 13 Sheets-Sheet 3
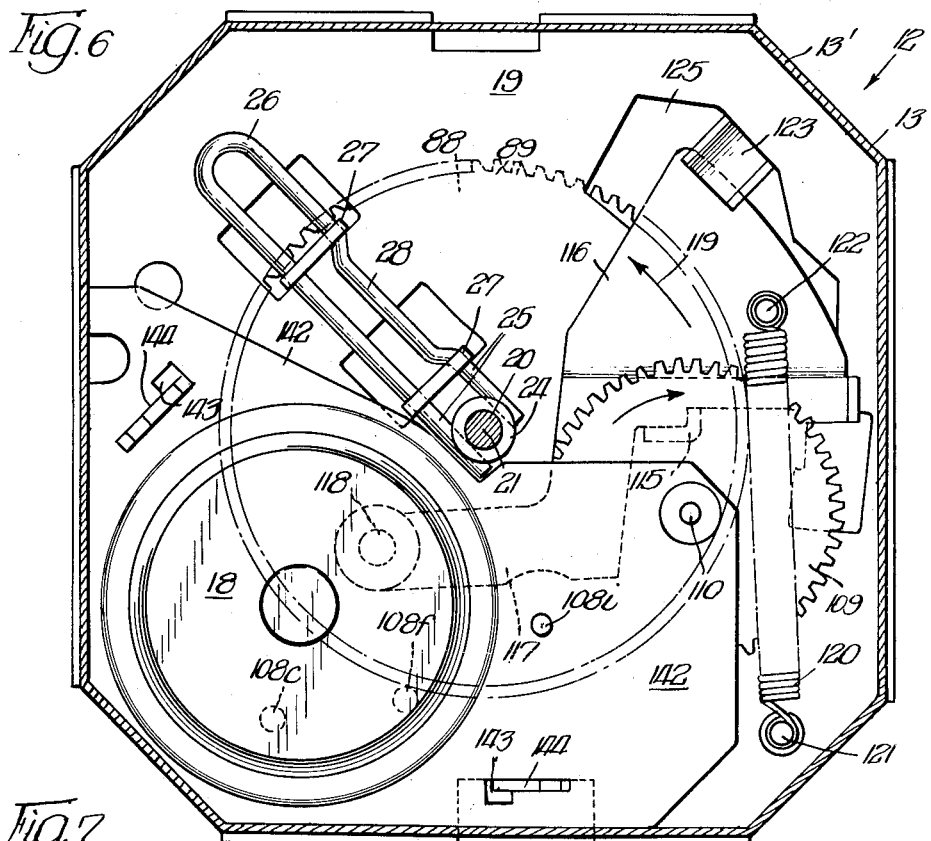
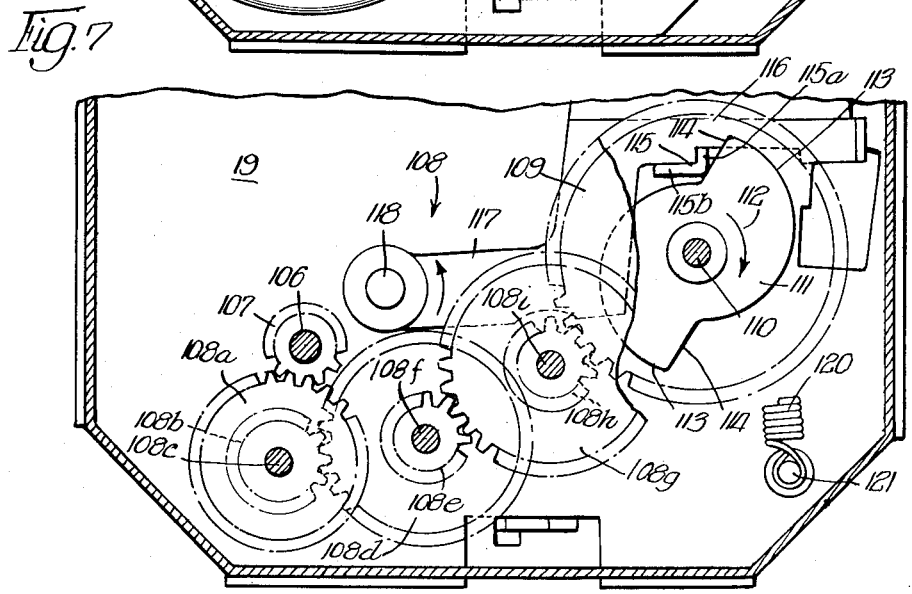

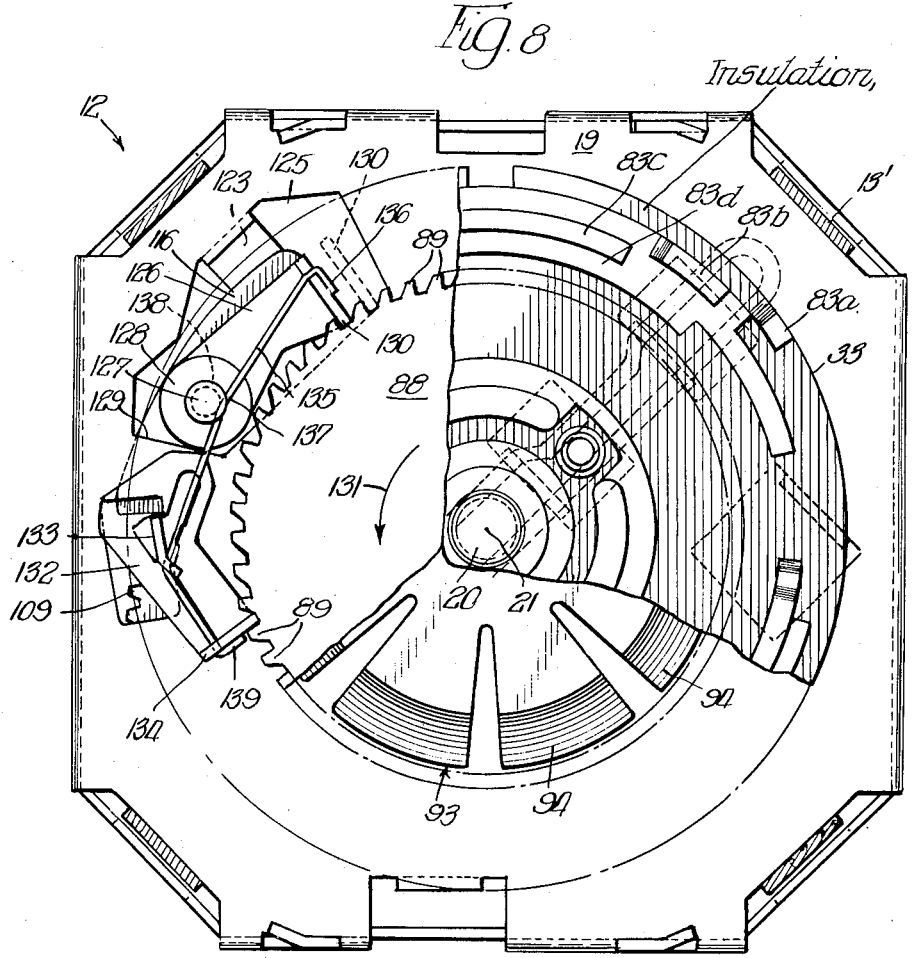

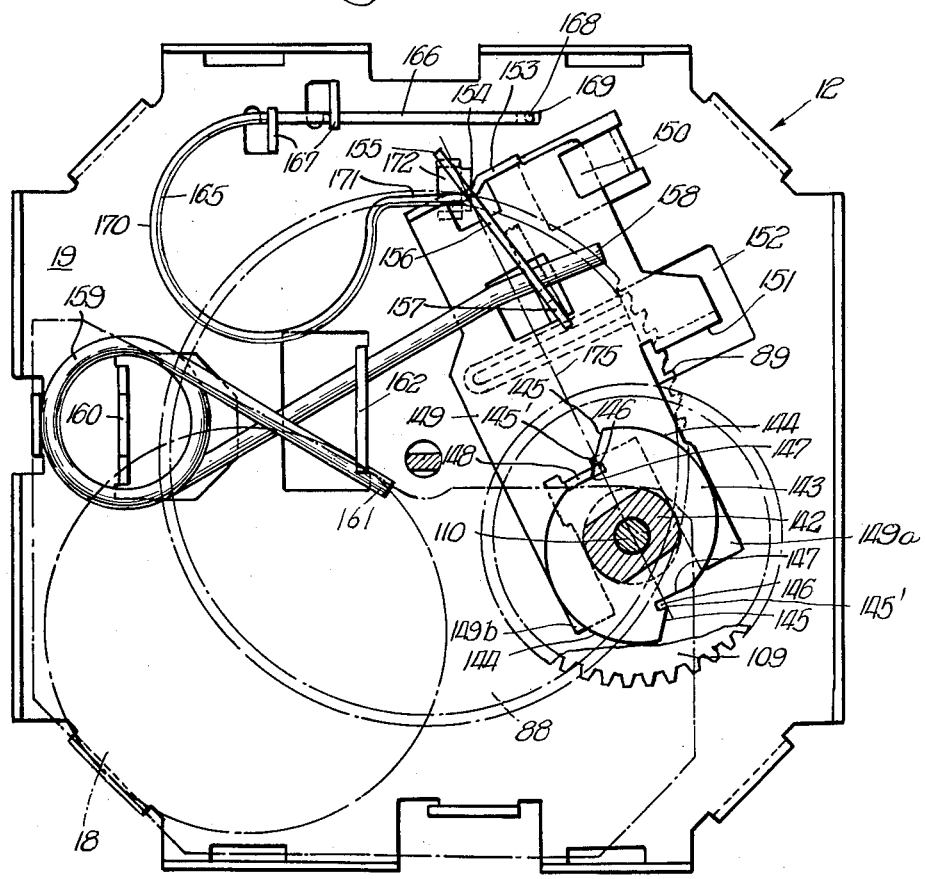

Oct. 23, 1962  A. W. GARDES  3,060,289
OPERATING MEANS FOR CIRCUIT CONTROLLER AND THE LIKE
Filed Nov. 23, 1959  13 Sheets-Sheet 6
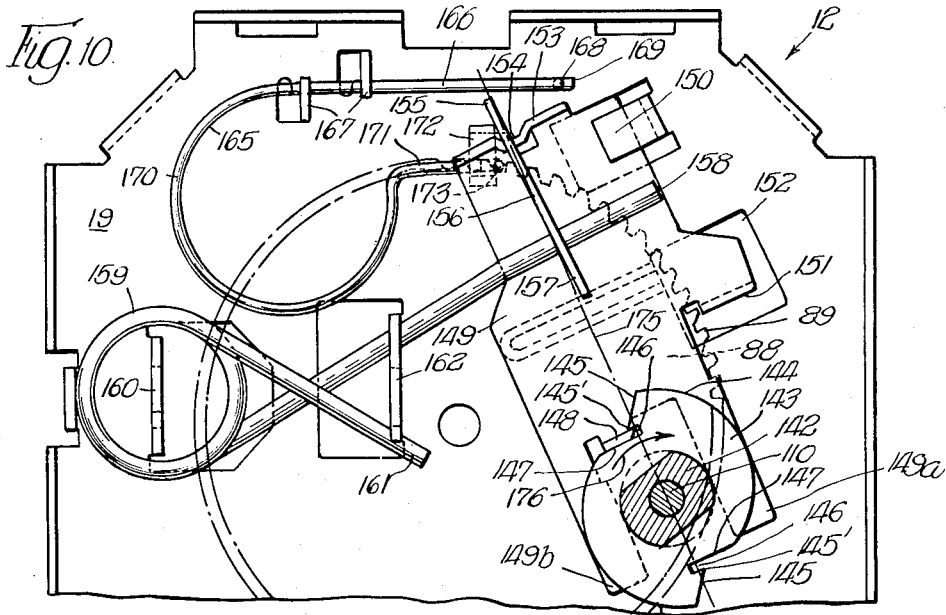
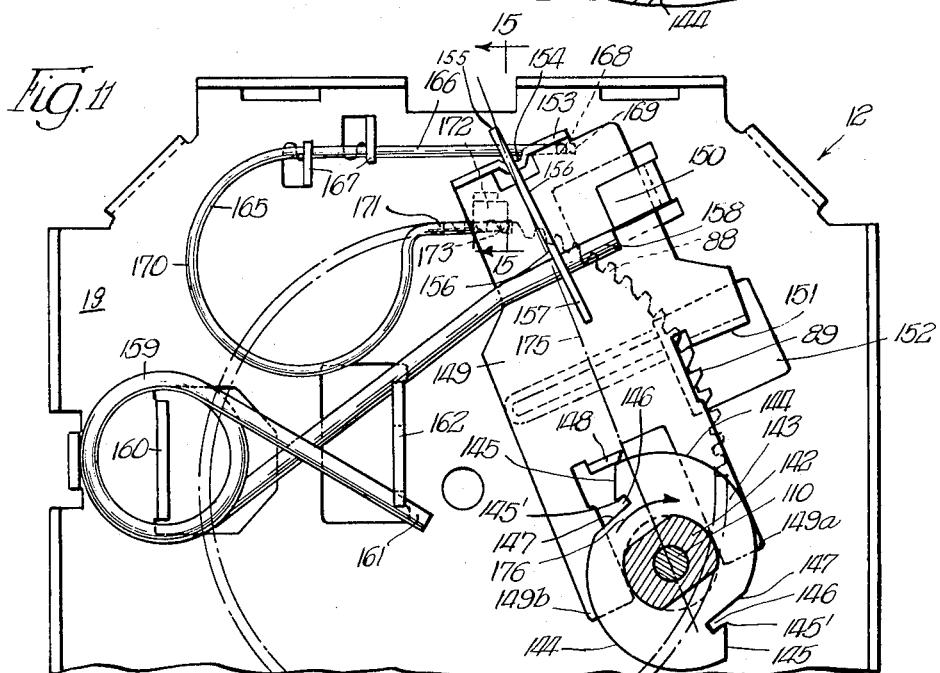
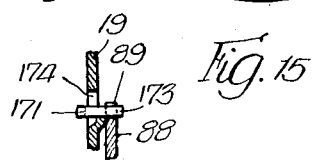

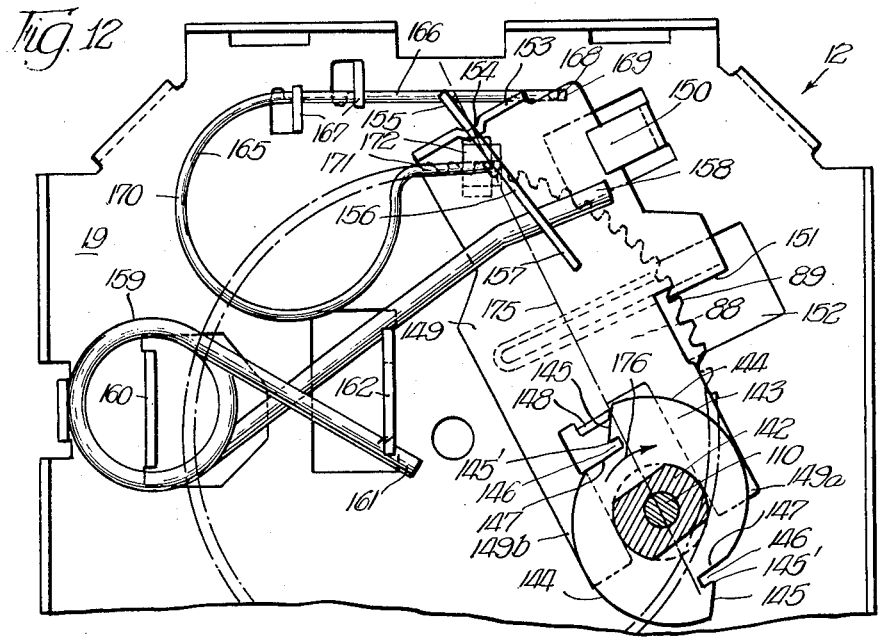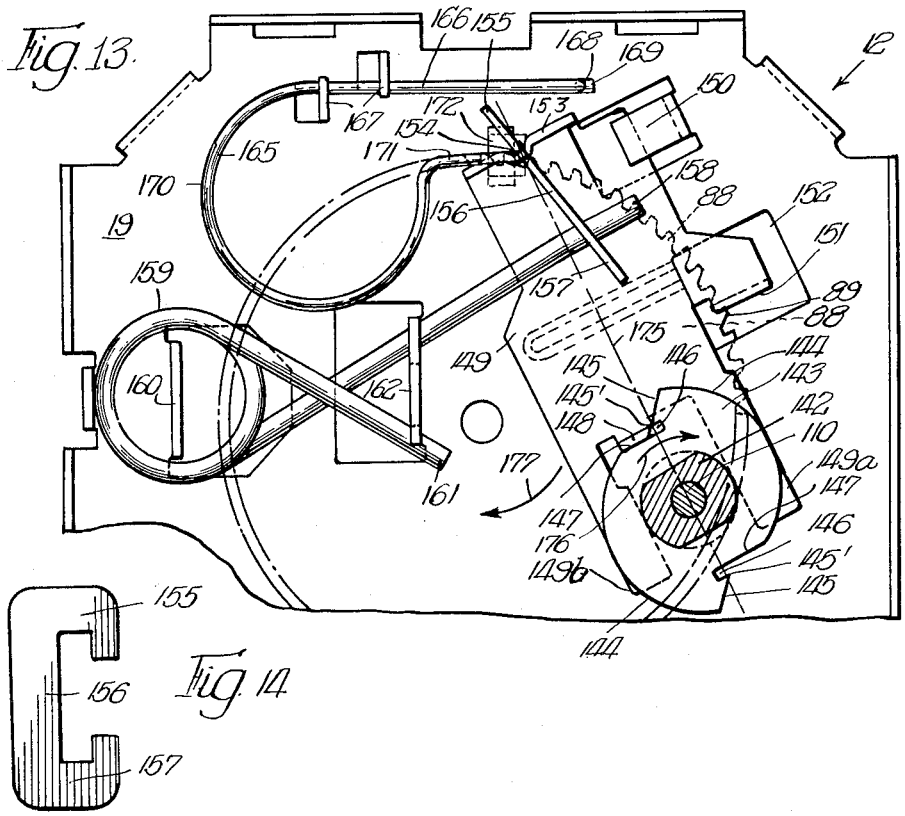

Oct. 23, 1962 A. W. GARDES 3,060,289
OPERATING MEANS FOR CIRCUIT CONTROLLER AND THE LIKE
Filed Nov. 23, 1959 13 Sheets-Sheet 8
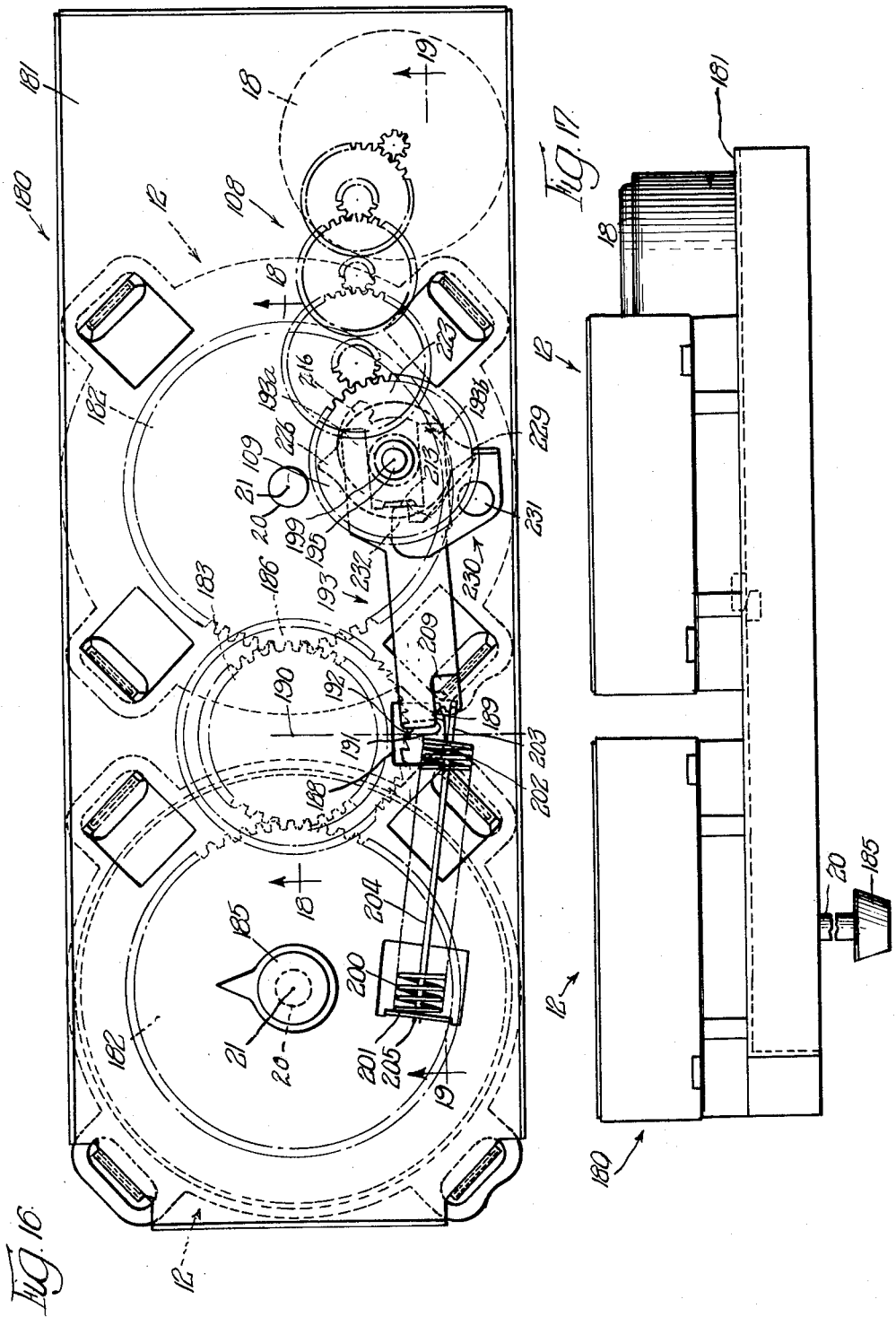

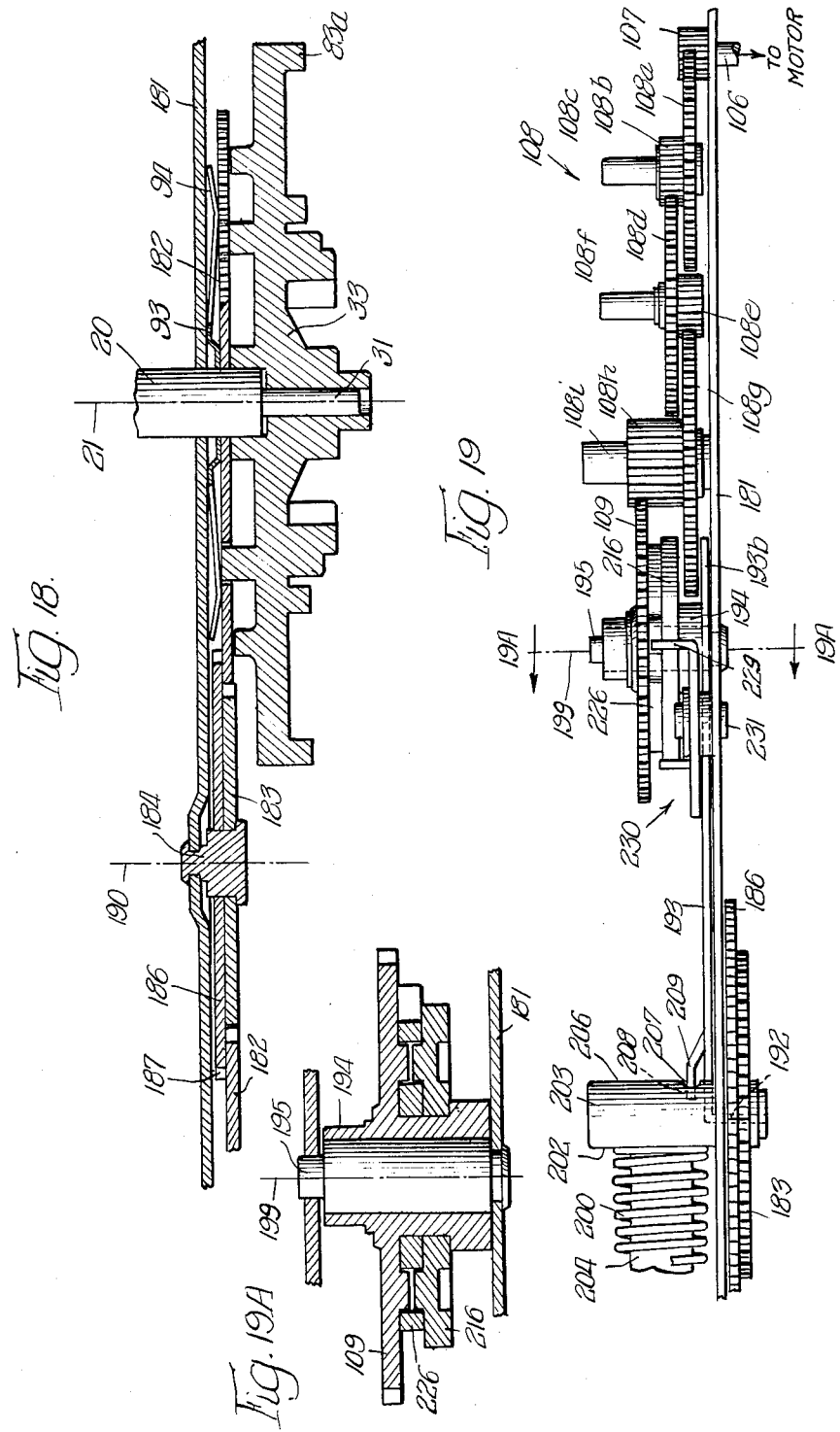

Oct. 23, 1962  A. W. GARDES  3,060,289
OPERATING MEANS FOR CIRCUIT CONTROLLER AND THE LIKE
Filed Nov. 23, 1959  13 Sheets-Sheet 10
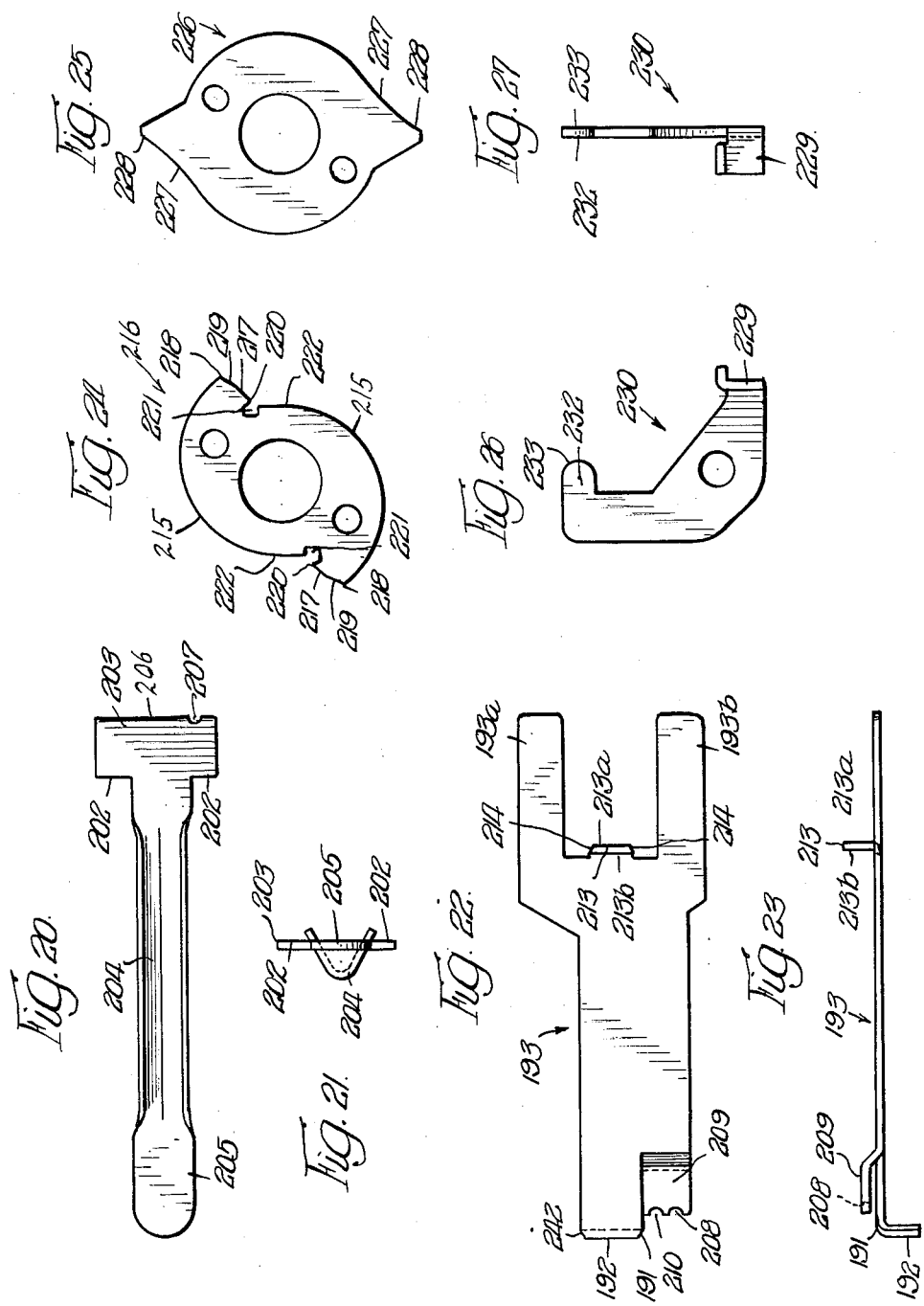

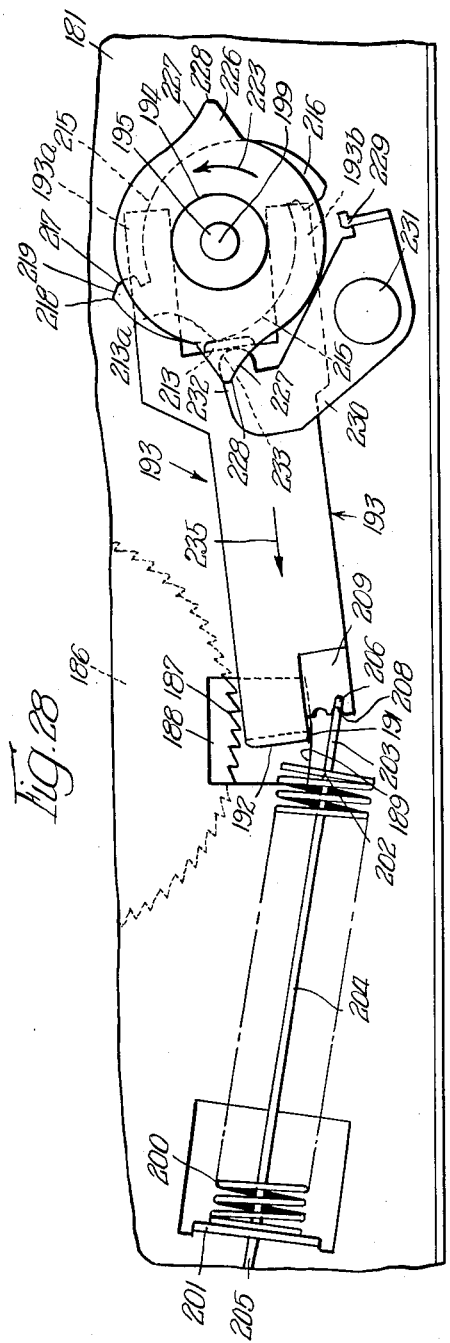
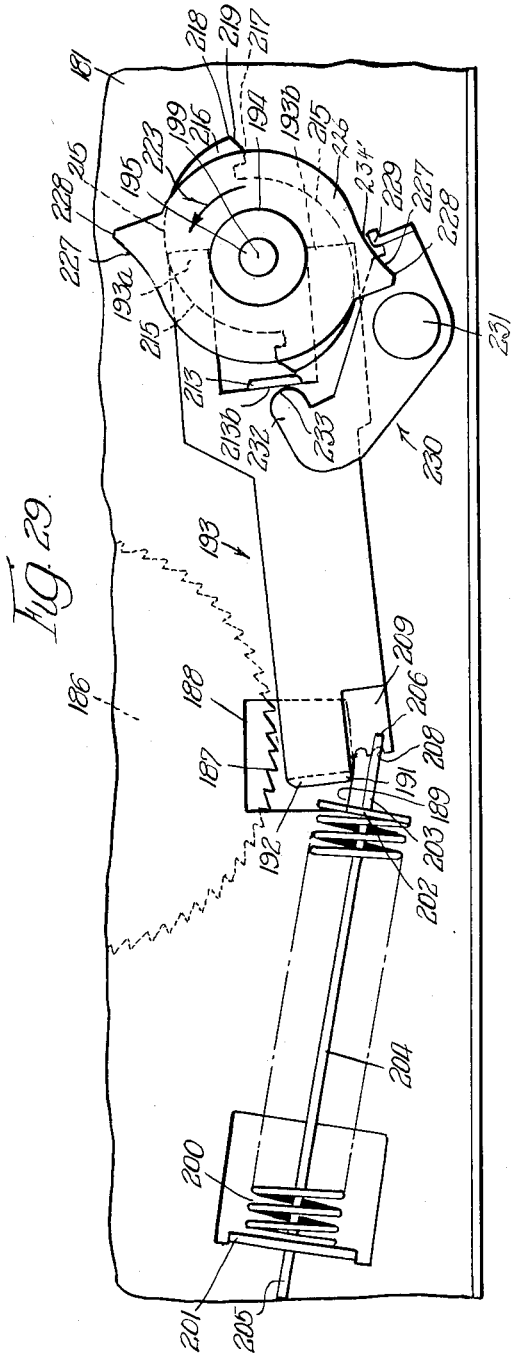

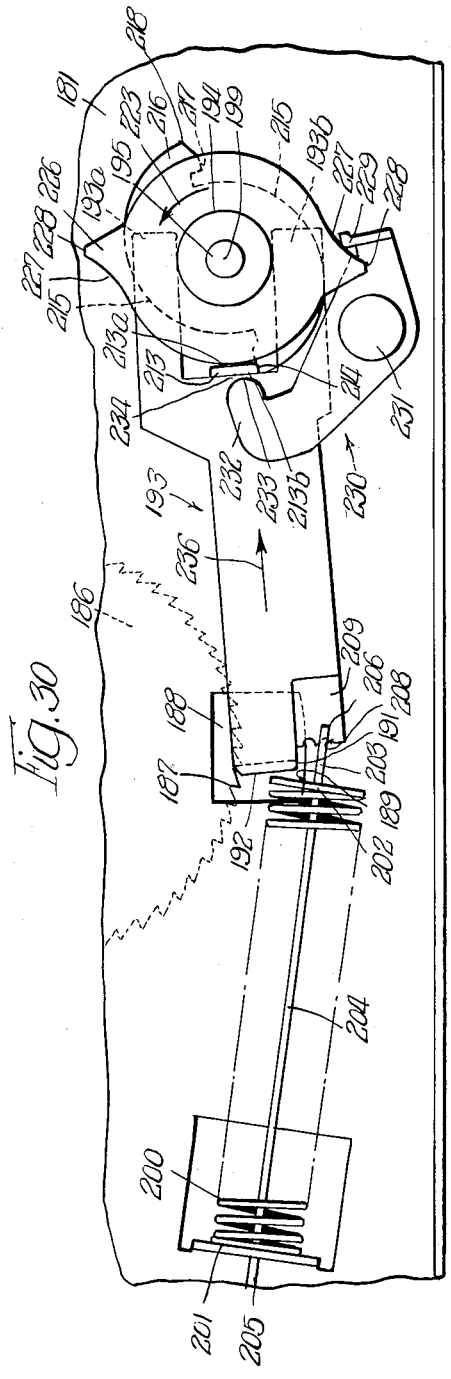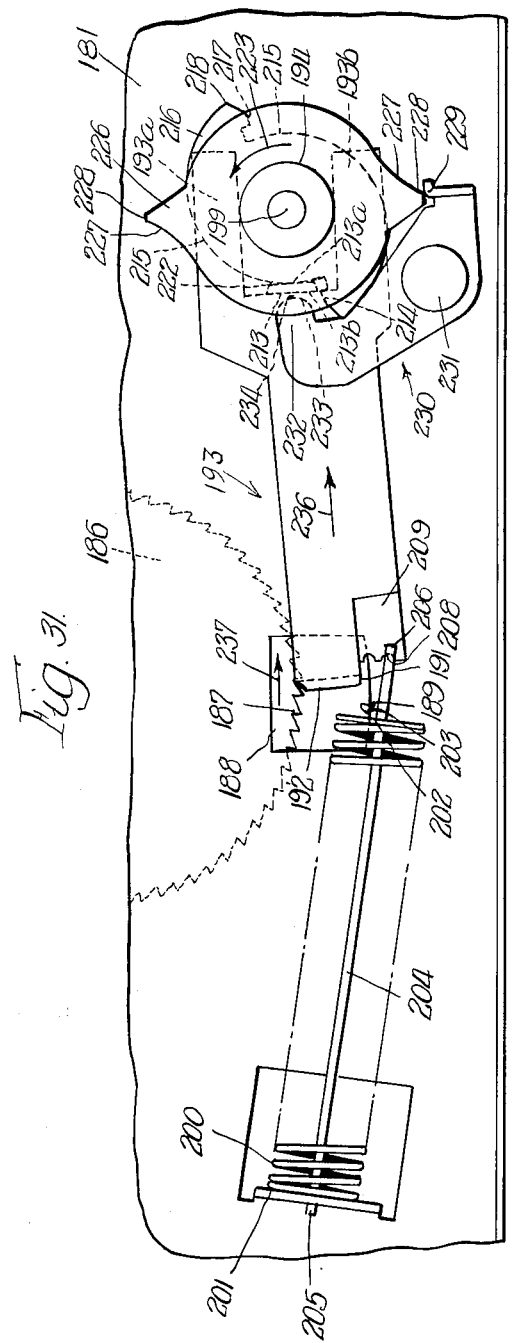

Oct. 23, 1962  A. W. GARDES  3,060,289
OPERATING MEANS FOR CIRCUIT CONTROLLER AND THE LIKE
Filed Nov. 23, 1959  13 Sheets-Sheet 13

United States Patent Office 3,060,289
Patented Oct. 23, 1962

3,060,289
OPERATING MEANS FOR CIRCUIT CONTROLLER AND THE LIKE
Alfred W. Gardes, Wilmette, Ill., assignor to International Register Company, Chicago, Ill., a corporation of Illinois
Filed Nov. 23, 1959, Ser. No. 854,871
35 Claims. (Cl. 200—38)

This invention relates, generally, to electric switches and it has particular relation to circuit controller means for operating a device, such as a washing machine, according to any one of several pre-selected programs. This application is a continuation-in-part of application Serial No. 817,584, filed June 2, 1959.

Among the objects of this invention are: To provide a new and improved ratchet operating mechanism; to arrange the ratchet operating mechanism for operation in either direction at any part of its operating cycle; to provide for controlling the operation of a step-by-step mechanism of the nature of switch means that control the functioning of a cyclically operable device such as a washing machine or the like, in a new and improved manner; to operate the switch means in a step-by-step fashion through the cooperation of a ratchet wheel and an indexing lever that is mounted for both rotary and translatory movement; to bias the indexing lever by an operating spring for advancing the ratchet wheel; to interconnect the indexing lever and operating spring by a link; to retract the indexing lever and store energy in the operating spring by a drive cam operated by a motor at a constant speed; to employ a wire spring in the form of a loop having one end engaging a tooth of the ratchet wheel to prevent reverse rotation; to apply force by a tooth of the ratchet wheel to the end of the wire spring acting principally in shear; to employ a relatively light operating spring for advancing the indexing lever and ratchet wheel to reduce the shock applied to the operated device, such as switch means; to apply additional force to operate the indexing lever and ratchet wheel and thereby the operated device in the event that sufficient energy is not stored in the operating spring to effect such operation; to obtain the additional force from the motor at a time when substantially no load is applied to the drive cam; to employ a booster cam driven by the motor to apply the additional force to the indexing lever through a booster pawl; to apply the booster force by the booster pawl to the indexing lever in such a direction as to urge it toward the ratchet wheel and maintain operative connection thereto; to apply the force of the operating spring in a direction to hold the indexing lever out of engagement with the ratchet wheel; to move the indexing lever into engagement with the ratchet wheel by operation of the drive cam in conjunction with the operating spring; to provide duplicate switch means and operate the same by a single motor controlled step by step operating mechanism; and to employ essentially the same arrangement and operating mechanism used for operating the duplicate switch means for operating a single switch means.

Other objects of this invention will, in part, be obvious and in part appear hereinafter.

This invention is disclosed in the embodiments thereof shown in the accompanying drawings and it comprises the features of construction, combination of elements and arrangement of parts that will be exemplified in the constructions hereinafter set forth and the scope of the application of which will be indicated in the appended claims.

For a more complete understanding of the nature and scope of this invention, reference can be had to the following detailed description, taken together with the accompanying drawings, in which:

FIGURE 1 is a view, in front elevation, of a portion of panel of a device, such as a washing machine, with which the present invention can be employed and showing a typical form of dial that can be employed for setting the circuit controller;

FIGURE 2 is a view, in front elevation, of the circuit controller disclosed in the application above referred to with which the present invention can be employed, it being shown dismounted from the panel, and the dial omitted;

FIGURE 3 is a view, in side elevation, of the circuit controller;

FIGURE 4 is a view, in rear elevation, of the circuit controller;

FIGURE 6 is a vertical sectional view taken generally along the line 6—6 of FIGURE 5 and showing the motor mounting and certain parts that are associated therewith;

FIGURE 7 is a view, similar to FIGURE 6, with the motor and the motor mounting plate removed in order to show more clearly the gear train and the operating cam that is driven thereby;

FIGURE 8 is a vertical sectional view taken generally along the line 8—8 of FIGURE 5, certain parts being broken away in order to show more clearly the ratchet wheel and operating parts associated therewith and the spring which urges the multiple race cam against the biasing forces exerted by the springs which react on the switch blades;

FIGURE 9 is a view, similar to FIGURE 6, and showing a form of step by step operating mechanism interconnecting the constant speed motor and the ratchet wheel and constructed according to this invention;

FIGURES 10, 11, 12 and 13 show different operating position of the step by step operating mechanism shown in FIGURE 9;

FIGURE 14 is a view in side elevation of the link employed in the constructions shown in FIGURES 10–13;

FIGURE 15 is a vertical sectional view taken generally along the line 15—15 of FIGURE 11 and showing the manner in which the ratchet wheel is held against reverse rotation;

FIGURE 16 is a view in front elevation of a dual lateral circuit controller arrangement provided with an operating mechanism common to both circuit controllers, the cover plate having been removed in order to show more clearly the details of construction of the operating mechanism;

FIGURE 17 is a top plan view of the dual lateral circuit controller mechanism shown in FIGURE 16;

FIGURE 18 is a sectional view taken generally along the line 18—18 of FIGURE 16 and showing the relationship between the gear wheel which is connected to the ratchet wheel and the gear wheel which is secured to the cam plate of one of the circuit controllers, it being understood that the connection to the gear wheel of the other circuit controller is identical;

FIGURE 19 is a horizontal sectional view taken generally along the line 19—19 of FIGURE 16 to show certain of the details of the operating mechanism;

FIGURE 19A is a vertical sectional view taken generally along the line 19A—19A of FIGURE 19;

FIGURES 20, 21, 22, 23, 24, 25, 26 and 27 are views showing the several parts making up the operating mechanism shown in FIGURES 16 and 19 of the drawings;

FIGURES 28, 29, 30 and 31 show different positions of the operating mechanism when the operating spring has sufficient energy stored in it to advance the indexing lever, the ratchet wheel and the two circuit control devices;

Figure 32:
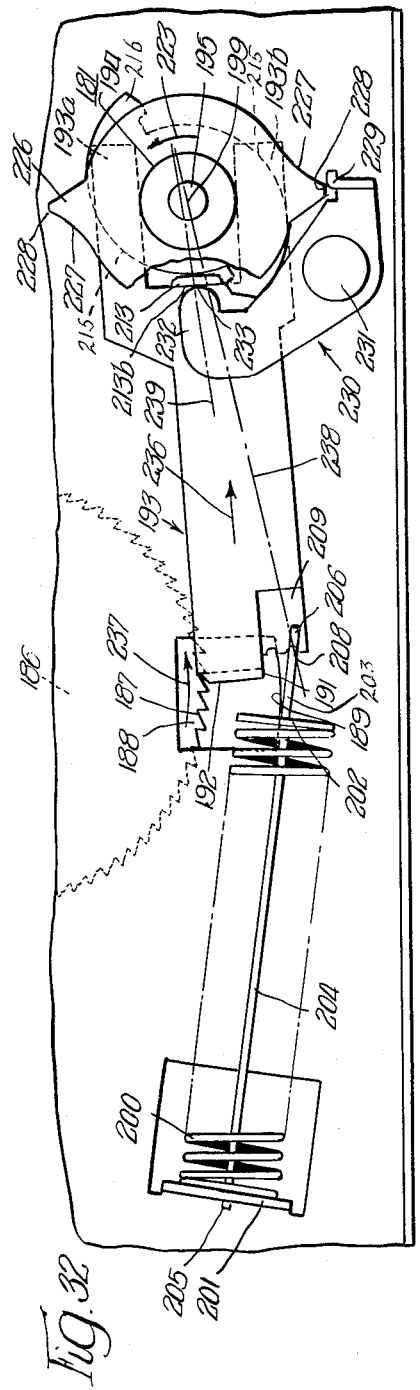
Figure 33:
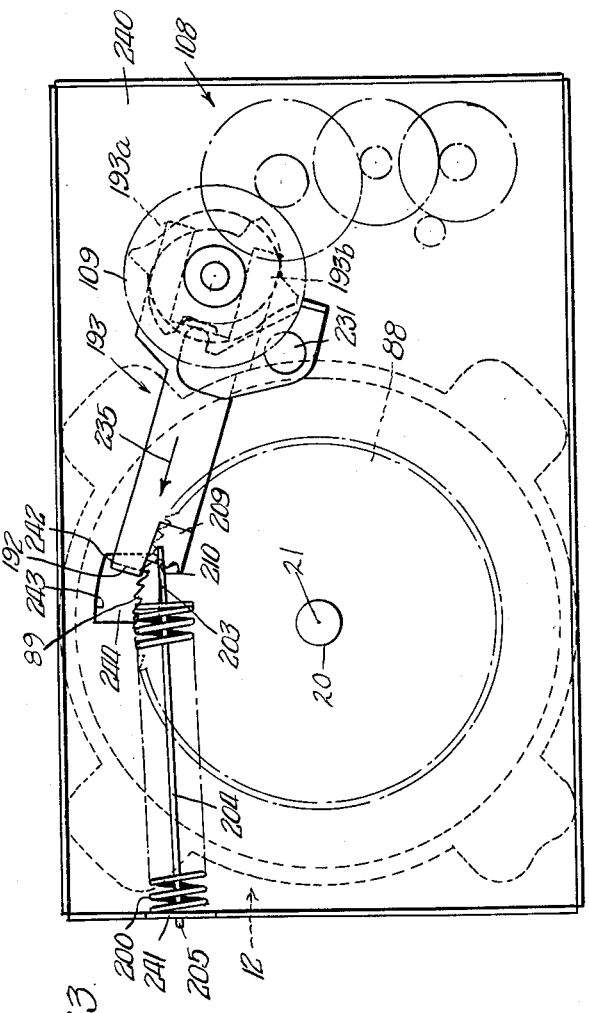

FIGURE 32 shows the operation of the operating mechanism when the energy stored in the operating spring is insufficient to advance the indexing lever, ratchet wheel and circuit controllers, the additional operating force being provided by the booster cam operating through the booster pawl; and FIGURE 33 is a view, similar to FIGURE 16, showing how the operating mechanism of the present invention can be used for controlling the operation of a single circuit controller having the ratchet wheel directly associated therewith and using essentially the same parts for the operating mechanism.

Referring now particularly to FIGURES 1 through 6 of the drawings, it will be observed that the reference character 10 designates a panel of a device, such as a washing machine, the operation of which is to be controlled so that it will perform different cycles of operation in proper timed sequence. A dial 11 is provided for rotation relative to the panel 10 and it carries indicia indicating typical cycles of operation that may be performed under the control of the circuit controller of the present invention.

Mounted on the rear of the panel 10 is a circuit controller that is indicated, generally, at 12. Since the details of construction of the circuit controller 12 are required for a more complete understanding of the present invention, they are set forth in full herein. The circuit controller 12 is constructed in such manner as to provide the desired programming of the cycles of operation of the washing machine with which it is associated. These cycles of operation and the number of different cycles vary depending upon the particular washing machine that is controlled. There is shown herein a particular construction but it will be understood that it can be varied to provide more or less cycles in the program of operation and greater or smaller amounts of time for the performance of each cycle as may be desired. Also it will be shown how two of the circuit controllers 12 can be arranged for common operation to provide double the number of control circuits that are available when only a single circuit controller 12 is used.

The circuit controller 12 has a metal case 13 which is formed preferably of sheet steel and includes a front plate 14 that may be provided with bushings 15 which are internally threaded for receiving screws to hold the circuit controller 12 in place on the panel 10. The front plate 14 is provided in the lower left corner with a circular opening 17 that registers with a motor, shown generally at 18. This portion of the front plate 14 is removed in order to avoid adversely affecting the magnetic field of the motor 18. The metal case 13 also includes a back plate 19 that is formed of sheet steel and is suitably secured to the central portion 13′ of the metal case 13 as by lugs struck from the central portion 13′.

Journaled centrally of the front plate 14 and back plate 19 is a manually roatable shaft 20. The shaft 20 is arranged to rotate about an operating axis that is indicated by the broken line 21. Reference is made herein to the operating axis 21 to provide an axis of reference for the various parts making up the circuit controller 12. It is this axis to which reference is made in the claims.

A pin 22 extends transversely through the shaft 20 to provide for a non-rotatable connection between the shaft 20 and the dial 11 so that the two rotate conjointly.

The shaft 20 is not only rotatable but also it is endwise movable through a limited extent which is governed by the spacing between snap rings 23 which engage either the front side or the back side of the front plate 14 in limiting the endwise movement of the shaft 20.

Figure 5:
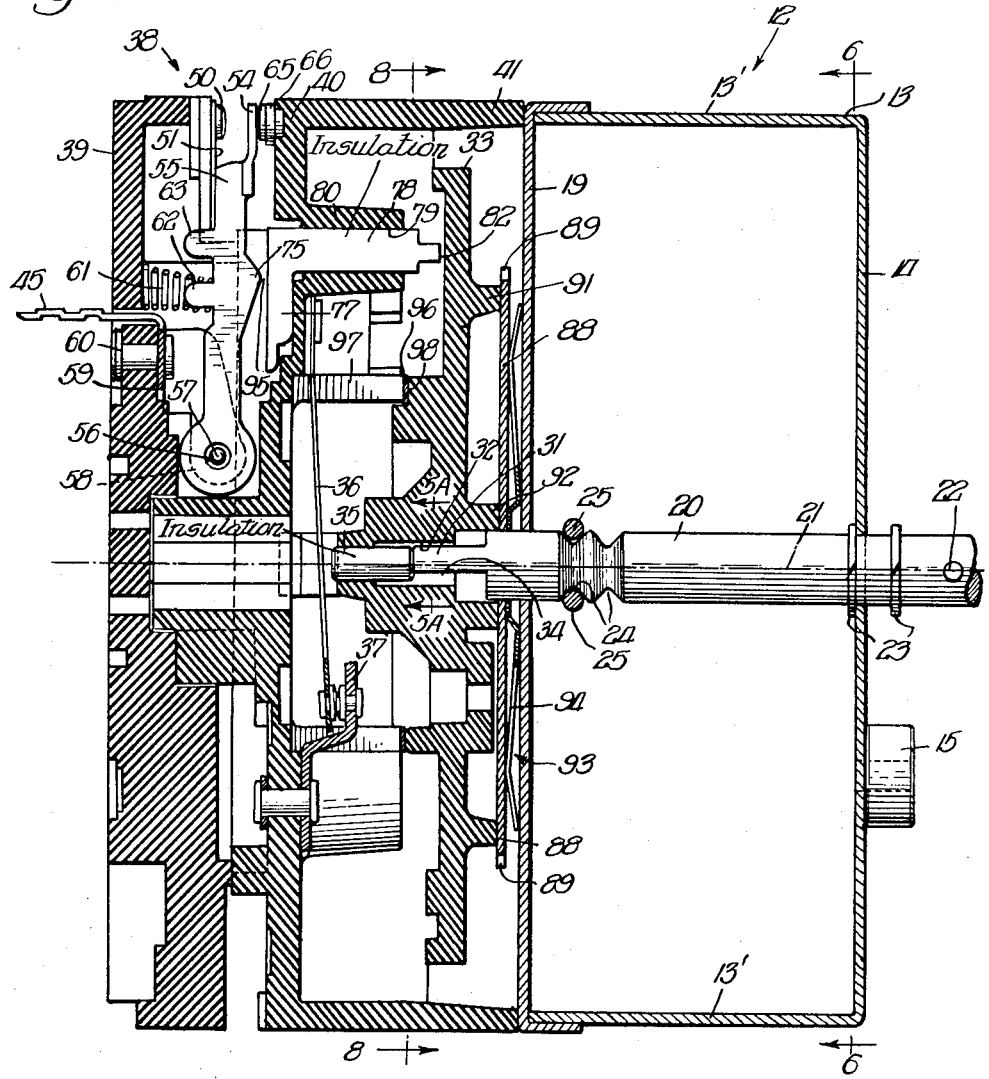
FIGURE 5 is a view, at an enlarged scale, taken generally along the line 5—5 of FIGURE 4, the gear train and indexing lever being omitted.

It is desirable that the shaft 20 be held in either of its endwise operating positions. For this purpose, as shown in FIGURES 5 and 6, annular grooves 24 are provided in spaced relation adjacent the back plate 19. Cooperating with the grooves are arms 25 of a hairpin 26. The hairpin 26 is formed of resilient material and is mounted on lugs 27 that are struck up from the back plate 19.

One of the arms 25 has an inwardly deformed portion 28 for the purpose of holding the hairpin 26 in place in notches in the lugs 27. The arms 25 of the hairpin 26 are biased toward each other and serve to grip the shaft 20 in one or the other of the grooves 24. When the shaft 20 is moved manually endwise from one position to the other, the arms 25 are spread apart and some endwise force must be applied to accomplish this. However, once the shaft 20 has been moved from one position to the other, the arms 25, because of their resiliency, interfit with one or the other of the grooves 24 and thereby act to prevent endwise movement of the shaft 20 until sufficient force is applied thereto to lift the arms 25 out of the groove 24 in which they may be located.

Figure 5A:
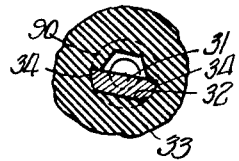
FIGURE 5A is a detail sectional view taken generally along the line 5A—5A of FIGURE 5 to show the manner in which the operating shaft is connected to the multiple race cam.

At its inner end the shaft 20 is provided with a flat end portion 31 one side of which bears against a surface 32 of a segment forming an integral part of a multiple race cam 33 that is formed preferably of insulating material. The construction is shown more clearly in FIGURE 5A where it will be observed that the other side of the flat end portion 31 at its ends bears against end surfaces 34 of a semi-circular portion that also is formed integrally with the multiple race cam 33. Because of the relationship between the flat end portion 31 of the shaft 20 and the surfaces 32 and 34, the shaft 20 rotates conjointly with the multiple race cam 33 regardless of whether the rotating force is applied manually through the shaft 20 or mechanically through the multiple race cam 33 in a manner to be described hereinafter. Further, this construction permits assembly of the shaft 20 with the multiple race cam 33 only in one position. This insures proper alignment between the dial 11 and the multiple race cam 33.

One reason for arranging for endwise movement of the shaft 20 is to have it operate through an insulating pin 35, slidably mounted centrally of the multiple race cam 33, a resilient switch blade 36 with respect to a stationary contact 37. As shown in FIGURE 5, when the shaft 20 occupies the position there illustrated, the resilient switch blade 36 completes a circuit through the stationary contact 37. This circuit closure can be used for controlling the operation of the washing machine. In order to stop the washing machine motor (not shown) or perform some other function at any time, all that is required is to move the dial 11 and therewith the shaft 20 inwardly to such position that the resilient switch blade 36 is moved out of engagement with the stationary contact 37.

Mounted on and to the left of the metal case 13, as viewed in FIGURE 5, is a pair of switch plates that are indicated, generally, at 38. The switch plates 38 are formed of suitable insulating material and are positioned in juxtaposed parallel spaced relation and arranged centrally of the operating axis 21 previously referred to. The switch plates 38 include one switch plate 39 that forms the rear end of the circuit controller 12 while the other switch plate 40 is interposed between the switch plate 39 and the metal case 13. An annular housing 41 is formed integrally with the other switch plate 40 and, as shown more clearly in FIGURE 4 of the drawings, feet 42 are formed integrally therewith for receiving lugs 43 that extend rearwardly from the back plate 19 and are bent over to hold the cam housing 41 securely in place on the metal case 13. The one switch plate 39 is held in place on the other switch plate 40 by suitable means such as four screws 44 which appear in FIGURE 4 of the drawings.

Attention is directed to the fact that the resilient switch blade 36, FIGURE 5, is mounted on the right or front side of the other switch plate 40 and that the stationary contact 37 is likewise mounted on this same member. When the shaft 20 is moved inwardly or toward the left, as viewed in FIGURE 5, the switch blade 36 is moved to the open circuit position and toward the right side of the other switch plate 40.

Any suitable means can be provided for making connections to the various circuit elements to be described and carried by the switch plates 38. Conventional terminals are indicated at 45 in FIGURES 3, 4 and 5. Conductors 46 interconnect certain of the terminals 45 and the motor 18 for energizing it. A jumper 47 in the form of a conductor interconnects certain of the terminals 45. It will be appreciated that various combinations of circuit connections are available, depending upon the requirements.

As disclosed in the application above referred to the one switch plate 39 carries a number of contacts 50. Provision is made for the receipt of eight of the contacts 50 on the one switch plate 39. For a purpose that will be more clearly apparent hereinafter each of the contacts 50 is mounted on a resilient mounting plate 51 which is secured by a rivet 52 to the one switch plate 39. It will be understood that one of the terminals 45 is secured by the rivet 52 on the opposite side of the one switch plate 39 to provide the required terminal connection. Attention is directed to the fact that the contacts 50 are located along a circle the center of which is the operating axis 21 which extends centrally of the one switch plate 39.

The resiliently mounted contacts 50 are arranged to be individually engaged by flat contact plates 54 that are welded to flat switch blades 55 which extend radially from the operating axis 21. At the end of each switch blade 55 adjacent the operating axis 21 there is provided a transverse aperture 56 which is shown more clearly in FIGURE 5. Each end of each transverse aperture 56 is arranged to be engaged by a protuberance 57. The protuberances 57 are integrally formed in and struck inwardly from a pair of spaced conducting lugs 58 that are formed integrally with a central portion 59 from which a terminal 45, also formed integrally with the central portion 59, extends. A rivet 60 serves to hold each assembly in place. It will be observed that the rivet 60 extends through the central portion 59 and through the one switch plate 39. With this construction it will be observed that each of the flat switch blades 55 is pivotally mounted adjacent the operating axis 21 and that good contact engagement therewith is provided without requiring the use of a flexible shunt or other similar means. The spaced conducting lugs 58 have sufficient inherent resiliency to provide good contact engagement with opposite sides of the flat switch blade 55 and are also sufficiently resilient to permit the insertion therebetween of each switch blade 55 on assembly.

Each switch blade 55 is biased away from the one switch plate 39 by a coil compression spring 61. Each spring 61 reacts between the front side of the one switch plate 39 and the respective flat switch blade 55. It is guided on the latter by a lug 62. The movement of each switch blade 55 is guided by a guide lug 63 which moves in a suitable gap in a rib that is formed integrally with and extends annularly around the one switch plate 39.

Each of the flat contact plates 54 carried by the respective switch blade 55 at its outer end is arranged to engage a contact 65 which is stationarily mounted on the other switch plate 40. Since the coil compression spring 61 reacts directly against the switch blade 55, and the amount of contact pressure exerted thereby between each contact plate 54 and its stationary contact 65 can be readily predetermined, it is desirable that the contacts 65 be stationarily mounted on the other switch plate 40. For this purpose each of the contacts 65 is mounted on a contact plate 66 which is carried flatwise by the rear side of the other switch plate 40 and is secured thereby by a rivet. It will be observed that a terminal 45 is formed integrally with each contact plate 66 and extends through a suitable opening in the one switch plate 39 to permit connection at the rear of the circuit controller 12. Attention is directed to the fact that the stationary contacts 65 are located along a circle the center of which is the operating axis 21. The diameter of the circle is the same as the diameter of the circle along which the resiliently mounted contacts 50 are located.

Provision is made for moving the switch blades 55 individually away from the other switch plate 40 and against the biasing forces of the respective coil compression springs 61. For this purpose there is provided an operating force receiving portion 75 intermediate the ends of each switch blade 55. As shown in FIGURE 5 this portion 75 is in the form of a protuberance and is located slightly beyond the spring 61 and away from the pivot axis of the switch blade 55 to stabilize it in the lugs 58. Also the lower side of the circular inner end of each switch blade 55 is spaced slightly from the juxtaposed bearing surface on the other switch plate 40 to prevent escape from the lugs 58. The operating force receiving portion 75 is located along a circle the center of which is the operating axis 21. Thus the operating force is applied to each switch blade 55 at the same location with the result that uniform contact pressures are maintained between the resiliently mounted contacts 50 and the respective flat contact plate 54 or the head 74 as the case may be.

Each of the operating force receiving portions 75 is arranged to be engaged individually by a head 77 that is formed integrally with an operating pin 78. Preferably the head 77 and pin 78 are formed of suitable insulating material. Each operating pin 78 is slidable in an opening 79 that is formed in a boss 80 that extends inwardly from the other switch plate 40 and is integral therewith. It will be observed that the operating pin 78 extends parallel to the operating axis 21. However, each operating pin 78 is located at a different distance from the operating axis 21. As disclosed in the application above referred to each of the operating pins 78 is located along a circle that is individual thereto. These circles are concentric with the operating axis 21. While the several operating pins 78 are located at different distances from the operating axis 21, because of the provision of the heads 77, engagement with the operating force receiving portion 75 of each switch blade 55 is readily permitted.

The end of each of the operating pins 78 opposite the head 77 is provided with a reduced section having an inclined surface 82. These inclined surfaces 82 at the inner ends of the operating pins 78 are arranged to have camming engagement with cam races 83a–d which are located respectively on the multiple race cam 33 along circles the diameters of which coincide with the diameters of the respective circles along which the operating pins 78 are located. When the multiple race cam 33 is rotated, the cam races are rotated therewith and are engaged by the inclined surfaces 82 of the respective operating pins 78. Depending upon the shape of the respective cam race, the operating pins 78 are either left in the position illustrated in FIGURE 5 where the contact plate 54 engages a stationary contact 65 or a contact plate 54 may be moved out of engagement with a stationary contact 65 but not into engagement with the respective resiliently mounted contact 50 until another part of the respective cam race is engaged whereupon the contact plate 54 engages the respective resiliently mounted contact 50.

Provision is made for rotating the multiple race cam 33 in a stepwise fashion. For this purpose a ratchet wheel 88, FIGURES 5 and 6, is used. The ratchet wheel 88 has radially extending ratchet teeth 89 which are engaged in a manner to be described hereinafter for rotating the multiple race cam 33. The ratchet wheel 88 is secured to the multiple race cam 33 by means of rivets. Near its outer periphery the ratchet wheel 88 bears against an annular rib 91 that is formed integrally with the multiple race cam 33. Near the center of the ratchet wheel 88 it bears against an end of a hub 92 which also is formed integrally with the multiple race cam 33.

When the operating force receiving portions 75 of the switch blades 55 are engaged by the heads 77, the springs 61 are compressed. Under these circumstances the forces exerted by the springs 61 are transmitted through the multiple race cam 33 to the ratchet wheel 88 and tend to move it toward the back plate 19 of the metal case 13. In order to oppose these spring forces a spring disc 93 is interposed between the juxtaposed faces of the back plate 19 and the ratchet wheel 88. The construction of the spring disc 93 is shown more clearly in FIGURE 8 where it will be observed it includes a number of sector shaped fingers 94 the outer ends of which, as shown in FIGURE 5, bear against the back plate 19 while a radially inwardly spaced portion bears against the juxtaposed face of the ratchet wheel 88.

It is desirable that a gap 95, FIGURE 5, be maintained between the operating force receiving portion 75 and the respective head 77 when no thrust is applied to the respective pin 78 by the respective cam race. In order to accommodate the tolerances that are incident to manufacturing operations a spacer 96 is provided between an annular rib 97 on the other switch plate 40 and an annular shoulder 98 which is located on the multiple race cam 33. Depending upon the particular dimensions of a given run of parts, spacers 96 of different thickness can be employed in order to maintain the proper gap 95. It will be understood that the multiple race cam 33 rotates in one direction only relative to the other switch plate 40 which is stationary.

The manner in which the ratchet wheel 88 is advanced in step by step fashion together with the multiple race cam 33 now will be described, particular reference being had to FIGURES 6, 7 and 8 of the drawings. For illustrative purposes the ratchet wheel 88 is shown with seventy-two teeth 89 on its periphery. A larger or smaller number of ratchet teeth can be employed as may be desired.

Referring now particularly to FIGURE 7 it will be observed that the reference character 106 is applied to a motor shaft which is driven by the motor 18 at a constant speed. Fast on the motor shaft 106 is a pinion 107 that is arranged to drive a reduction gear train which is indicated, generally, at 108. The gear train 108 includes a gear 108a and a pinion 108b which are mounted for conjoint rotation on a shaft 108c that extends forwardly from the back plate 19. The gear 108a meshes with the teeth of the pinion 107 and the teeth of the pinion 108b mesh with the teeth of a gear 108d which is mounted for conjoint rotation with a pinion 108e on a shaft 108f that projects forwardly from the back plate 19. The pinion 108e meshes with the teeth of a gear 108g that is mounted for conjoint rotation with a pinion 108h on a shaft 108i that extends forwardly from the back plate 19. The pinion 108h drives a gear 109 which is rotatably mounted on a shaft 110 that projects forwardly from the back plate 19. Mounted for conjoint rotation with the gear 109 and between it and the back plate 19 is a double lobed cam 111. It will be understood that the motor 18 drives the double lobed cam 111 through the reduction gear train 108 in the direction indicated by the arrow 112.

The double lobed cam 111 is arranged to advance the ratchet wheel 88 two steps for each complete rotation of the cam 111. For this purpose the cam 111 is provided with two eccentric arcuate cam surfaces 113 which terminate in generally radially extending drop off surfaces 114 and are arranged to engage a cam follower 115 which is provided with a vertically extending portion 115a for riding downwardly over one or the other of the drop off surfaces 114 and a horizontal extending portion 115b that is arranged to ride near its right end along the respective arcuate cam surface 113. The drop off surfaces 114 are slightly inclined to control the return speed of the indexing lever 116. For example, the angle of inclination may be such as to require about two seconds to return under the force of the indexing spring 120. This delay is employed to prevent breakage of the operating pins 78 by avoiding a snap action thereof.

The cam follower 115 is formed integrally with and extends forwardly from an indexing lever 116 which is provided with a laterally extending arm 117 that is pivotally mounted on a pin 118 which extends forwardly from the back plate 19. It will be understood that, as the double lobed cam 111 is rotated at a constant speed in the direction indicated by the arrow 112, FIGURE 7, the cam follower 115 will ride along one or the other of the eccentric arcuate cam surfaces 113 and thereby retract the indexing lever 116 a corresponding distance and in the direction indicated by the arrow 119 in FIGURE 6. At the end of the stroke when the cam follower 115 rides downwardly over one or the other of the drop off surfaces 114, the indexing lever 116 is advanced by the indexing spring 120 to effect a corresponding advance of the ratchet wheel 88. As shown in FIGURE 6 one end of the indexing spring 120 is secured to an anchor pin 121 which extends forwardly from the back plate 19. The other end of the indexing spring 120 is secured to an anchor pin 122 which extends forwardly from the sector shaped portion of the indexing lever 116. The sector shaped portion of the indexing lever 116 is guided for movement along the front side of the back plate 19 by a lug 123 which is struck from the back plate 19 and overlies the upper right portion of the indexing lever 116.

Referring now particularly to FIGURE 8, the manner in which the indexing lever is operatively connected to the ratchet wheel 88 will be noted. It will be recalled that the sector shaped portion of the indexing lever 116 is reciprocated over the front face of the back plate 19 through the interaction of the cam follower 115 with the double lobed cam 111 and the indexing spring 120. In FIGURE 8 the rear side of a portion of the indexing lever 116 appears through a slotted opening 125 in the back plate 19. In this slotted opening 125 there is provided an indexing pawl 126 which is pivoted on a pin 127 that extends rearwardly from the indexing lever 116. It is important that the extent of advance of the ratchet wheel 88 for each step be accurately limited. For accomplishing this a stop washer 128 is carried by the pin 127 and it is arranged to engage a stop shoulder 129 which forms one end of the slotted opening 125. When the stop washer 128 engages the stop shoulder 129, no further advance of the ratchet wheel 88 can take place under the influence of the indexing spring 120. The position of the cam follower 115, FIGURE 7, corresponds to the position of the stop washer 128 in engagement with the stop shoulder 129, FIGURE 8, at the end of one step of advance of the ratchet wheel 88. The outer end portion of the sector shaped part of the indexing lever 116 is offset forwardly so that the body portion of the indexing pawl 126 is offset slightly forwardly from the front face of the back plate 19. This permits the stop washer 128 to register with the stop shoulder 129. Extending rearwardly from the indexing pawl 126 and through the slotted opening 125 is an indexing tooth or detent 130 the lower edge of which is arranged to engage one of the teeth 89 on the ratchet wheel 88. The retracted position of the indexing tooth or detent 130 is shown by broken lines in FIGURE 8. The indexing tooth or detent 130 is operated in the direction indicated by the arrow 119. Then, as the cam follower 115 moves downwardly over one or the other of the drop off surfaces 114, the indexing spring 120 advances the indexing lever 116 and therewith the indexing pawl 126 and the indexing tooth 130 carried thereby. A corresponding advance of the ratchet wheel 88 in the direction indicated by the arrow 131 takes place through an extent of one tooth.

It is desired that the ratchet wheel 88 be held against reverse rotation. For this purpose a holding pawl 132 is provided. The holding pawl 132 is rockably mounted on the rear side of the back plate 19 by means of a lug 133 which is struck up therefrom. The holding pawl 132 overlies the rear surface of the back plate 19 and is provided with a rearwardly extending holding tooth or detent 134 that engages one of the teeth 89 of the ratchet wheel 88 and thus prevents rotation thereof in the direction opposite to that indicated by the arrow 131.

It is desirable that the indexing tooth or detent 130 and the holding tooth or detent 134 be biased toward the ratchet wheel 88 in order to ratchet past the ratchet teeth 89. For this purpose a pawl spring 135 in the form of a piece of resilient wire is employed and it is common to both of the teeth or detents 130 and 134. As shown in FIGURE 8 one end 136 of the pawl spring 135 overlies the indexing tooth or detent 130. The intermediate portion 137 extends through an annular groove 138 near the outer end of the pin 127. It will be understood that the pawl spring 135 reacts against the pin 127. The other end 139 of the pawl spring 135 overlies the holding tooth or detent 134. In this manner a single spring, i.e., the pawl spring 135, reacting against the pin 127 acts to bias the indexing tooth or detent 130 and the holding tooth or detent 134 toward the ratchet wheel 88.

FIGURES 9-15 show a mechanism, constructed in accordance with this invention, for interconnecting the gear 109 which rotates at a constant speed with the ratchet wheel 88. It will be observed that the gear 109 is mounted on a hub 142 which rotates on the shaft 110 that is staked to the back plate 19. Rotatably mounted with the gear 109 is a double lobed cam 143 which corresponds, generally, to the double lobed cam 111 shown in FIGURE 7 and previously described. The double lobed cam 143 is provided with a pair of eccentric arcuate cam surfaces 144 which terminate in inclined drop off surfaces 145. It will be observed that the surfaces 145 are inclined at a substantial angle away from a radius through the inner or trailing tip or edge 145' thereof for a purpose that will be apparent presently. The inclined drop off surfaces 145 terminate in notches 146 which have flat bottom surfaces 147 that are parallel to each other and extend at right angles to a diameter extending generally through the inner tips or edges 145' of the inclined drop off surfaces 145. A cam follower 148 is operated by the double lobed cam 143. The cam follower 148 extends forwardly from an indexing lever 149 which is mounted for rotation and slidable movement on the front side of the back plate 19. The indexing lever 149 is provided with spaced arms 149a and 149b which overlie opposite sides of the hub 142 and are guided thereby. It will be understood that the indexing lever 149 rotates about the hub 142. Because of the arms 149a and 149b, the indexing lever 149 has limited sidewise movement and can move endwise. The movement of the indexing lever 149 is guided over the front face of the back plate 19, in part, by a guide lug 150 that is struck up from the back plate 19. The right side of the indexing lever 149 is provided with a rearwardly extending tooth 151 the left edge of which is arranged to engage one of the teeth 89 of the ratchet wheel 88 to advance the same. The indexing tooth 151 extends through an opening 152 in the back plate 19. Except when the indexing tooth 151 is moved to engage a tooth 89 of the ratchet wheel 88, it remains out of engagement therewith as shown in FIGURE 10.

At its upper end the indexing lever 149 is provided with a forwardly extending flange 153 having a central groove 154 for receiving one end 155 of a link 156 which is shown more clearly in FIGURE 14 of the drawings. It will be observed that the link 156 is generally C-shaped with the upper portion forming the end 155 overlying the groove 154 in the flange 153. The other end 157 of the link 156 is arranged to receive one arm 158 of an indexing spring 159 of the torsion type. The indexing spring 159 is wound around a lug 160 which is struck up from the back plate 19. The other end 161 of the indexing spring 151 is anchored against a lug 162 which is struck up from the back plate 19. The extent of advancing movement of the indexing tooth 151, carried by the indexing lever 149, is limited by engagement of the cam follower 148 with one or the other of the flat surfaces 147 on the cam 143.

It is desirable that means be provided for holding the ratchet wheel 88 against reverse rotation. For this purpose a holding spring 165 is provided in the form of a loop of spring wire. The holding spring 165 has an elongated upper end 166 which is held in place on the front side of the back plate 19 by lugs 167 which are struck from the back plate 19. The extreme right end 168 of the upper end 166 extends rearwardly through a slot 169 in the back plate 19. It will be observed that the left end of the upper end 166 is in the form of a loop 170 which is free to flex. It terminates in a straight portion 171 that is guided by a lug 172 which is struck from the back plate 19. As shown more clearly in FIGURE 15, the extreme end 173 of the straight portion 171 extends at right angles thereto through a slot 174 in the back plate 19 where it can engage a tooth 89 of the ratchet wheel 88 and prevent reverse movement thereof. Because the extreme end 173 projects only a slight distance rearwardly of the back plate 19 through the slot 174, the stress applied to the end 173 is substantially in shear and thus it has a relatively long life. At the same time it can ratchet freely past the teeth 89 of the ratchet wheel 88 as it is stepped forwardly in the manner described.

The sequence of operation of the mechanism shown in FIGURE 9 is illustrated in FIGURES 10-13. In the position shown in FIGURE 10 the link 156 is located slightly to the right of a line 175 which extends through the axis of rotation of the hub 142 and the point of application of the link 156 to the flange 153 at the upper end of the indexing lever 149. It will be understood that the double lobed cam 143 is rotated at a constant speed in the direction indicated by the arrow 176 in each of these figures and that the cam follower 148 pivots about the hub 142 on the cam 143.

In FIGURE 10 the cam follower 148 is shown as leaving the notch 146 and moving relative to the flat surface 147 as the latter is moved with the cam 143.

FIGURE 11 shows how the movement of the cam 143 in the direction indicated by the arrow 176 finally raises the cam follower 148 to the maximum height and thereby stores energy in or tensions the spring 159 to a maximum. During the period when the cam 143 is raising the cam follower 148, the drag between these parts and the off center pull by the indexing spring 159 through the link 156 hold the indexing tooth 151 out of engagement with the ratchet teeth 89 and the ratchet wheel 88 is held against reverse rotation by the end 173 of the holding spring 165. In FIGURE 11 the position of the parts is such that the link 156 is slightly to the right of the line 175. After the cam follower 148 starts down the inclined drop off surface 145, the link 156 swings further to the right away from the line 175.

The continued rotation of the cam 143 in the direction indicated by the arrow 176, as shown in FIGURE 12, causes the cam follower 148 to drop off of the end of the arcuate cam surface 144 and to move downwardly along the inclined drop off surface 145. When the cam follower 148 starts down the inclined drop off surface 145, the downward force applied by the indexing spring 159 through the link 156 and indexing lever 149, swings the indexing tooth 151 to the left into engagement with a tooth 89 of the ratchet wheel 88 and overcomes the tendency of the offset link 156 to hold the cam follower 148 to the right and therewith the indexing tooth 151 out of engagement with the teeth 89.

FIGURE 13 shows the position of the cam follower 148 at the lower end 145′ of the inclined drop off surface 145. During the final movement of the cam follower 148 along the lower end of the drop off surface 145, the indexing lever 149 is moved downwardly and carries with it the indexing tooth 151 now in engagement with a tooth 89 of the ratchet wheel 88. Accordingly, the ratchet wheel 88 is advanced one tooth in the direction indicated by the arrow 177. The right edge of the cam follower 148 now is in alignment with the notch 146 and the link 156 is free to swing this right edge to the right about hub 142 to enter the notch 146 accompanied by movement of the indexing tooth 151 out of engagement with the tooth 89 of the ratchet wheel 88, thereby completely freeing the ratchet wheel 88 from driving connection with the indexing tooth 151 and the indexing lever 149.

As the cam 143 continues to rotate in the direction indicated by the arrow 176, this sequence of operations is repeated for the other lobe. Thus, for each rotation of the cam 143, the ratchet wheel 88 is advanced through two steps and a corresponding movement of the multiple race cam 33 takes place.

When the circuit controller 12 is employed, it is possible to obtain sixteen control circuits and one additional circuit for controlling the operation of the motor 18. In some applications it is desirable to have a substantially larger number of circuits in order to provide a wider range in the cycling of the device, such as a washing machine, which is controlled. Accordingly, provision is made, as shown in FIGURES 16 and 17 of the drawings, to provide a dual lateral controller that is indicated, generally, at 180. For this purpose an elongated support plate 181 is employed and two of the circuit controllers 12, constructed as described hereinbefore, are mounted thereon. When such an arrangement is employed, it is possible to obtain seventeen additional control circuits using the particular arrangement described. It will be understood that these numbers of control circuits are mentioned for illustrative purposes and that other numbers can be provided on making suitable changes in the construction.

When the two circuit controllers 12 are mounted on the support plate 181, they are modified to substitute a driven gear wheel 182, FIGURES 16 and 18, for rotation with each of the multiple race cams 33. Thus, two operating axes 21 are provided, one for each of the circuit controllers 12 and the driven gear wheels 182 rotate about these axes, respectively. The spring disc 93 is interposed between each of the driven gear wheels 182 and the juxtaposed surface of the elongated support plate 181 to counteract the forces exerted by the coil compression springs 61 in the manner described hereinbefore.

It will be observed that the circuit controllers 12 are mounted in spaced relation on the support plate 181 to provide for receiving a drive gear wheel 183 therebetween. As shown in FIGURE 18, the drive gear wheel 183 meshes with the driven gear wheels 182 and is rotatable about a stub shaft 184 that is suitably mounted on the rear side of the elongated support plate 181. Since the circuit controllers 12 are geared together through the drive gear wheel 183 and the driven gear wheels 182, an operating knob 185 mounted on shaft 20 of one of the circuit controllers 12 is effective to operate both of the circuit controllers 12 simultaneously.

In order to operate the drive gear wheel 183 in a step-by-step fashion a ratchet wheel 186 is suitably secured thereto for conjoint rotation therewith. It corresponds to the ratchet wheel 88, previously described, and is provided with ratchet teeth 187, corresponding to the ratchet teeth 89.

In order to provide for operation of the ratchet wheel 186 and thereby the drive gear wheel 183 an opening 188 is provided in the elongated support plate 181 and its arcuate lower side 189 has its center of curvature at 190 which coincides with the axis of rotation of the drive gear wheel 183 and also of the ratchet wheel 186. The arcuate side 189 of the opening 188 serves as a guide for the under side 191 of an indexing tooth 192 that forms a part of an indexing lever, shown generally at 193, and illustrated in more detail in FIGURES 22 and 23 of the drawings. It will be observed that the indexing tooth 192 extends laterally from the indexing lever 193 and through the opening 188 so that its upper side can engage one of the ratchet teeth 187 on the ratchet wheel 186. At its other end the indexing lever 193 is provided with spaced arms 193a and 193b which extend on opposite sides of a bushing 194 that is rotatable on a pin 195 which is staked to the elongated support plate 181. The arrangement between the arms 193a and 193b of the indexing lever 193 and the bushing 194 is such that the indexing lever is rotatable about a pivot axis 199 extending through the center of the pin 195 and also it is movable endwise toward and away from this pivot axis for effecting the advance of the ratchet wheel 186.

Under ordinary operating conditions the indexing lever 193 is advanced to advance the ratchet wheel 186 by means of an indexing spring 200 one end of which reacts against a lug 201 that is struck upwardly from the elongated support plate 181. The other end of the indexing spring 200 reacts against one side 202 of a link 203, FIGURES 20 and 21, which has a stem 204, generally triangular in shape, that terminates in a blade portion 205 which projects through and is guided by the lug 201. The stem 204 serves to hold the turns of the coil compression spring 200 in alignment and the triangular shape provides increased rigidity. The other side 206 of the link 203 is provided with a notch 207 for engaging a notch 208 in an offset portion 209 of the indexing lever 193. As will be described hereinafter, energy is stored in the indexing spring 200 by the retraction of the indexing lever 193. By providing the interfitting notches 207 and 208, the proper mechanical relationship between the indexing lever 193 and the link 203 can be maintained, it being understood that the under side 191 of the indexing tooth 192 bearing against the arcuate side 189 of the opening 188 serves to limit the extent of downward movement of the indexing lever 193 while the indexing spring 200 is being loaded on retraction of the indexing lever 193.

It will be observed that a second notch 210 is provided in the offset portion 209 of the indexing lever 193. The purpose of this is to receive the notch 207 of the link 203 when the alternate construction, employing only a single circuit controller 12, as shown in FIGURE 33, is used.

As shown in FIGURES 22 and 23 of the drawings a cam follower 213 is formed integrally with the indexing lever 193 and it extends therefrom in a direction opposite to the direction in which the indexing tooth 192 extends. The ends 214 of the cam follower 213 are beveled so as to permit use of the indexing lever 193 in either of the two devices mentioned. One side 213a is arranged to be engaged by an eccentric arcuate cam surface 215 of a double lobed drive cam 216 which is shown in FIGURE 24 of the drawings. The drive cam 216 is secured to the bushing 194 and rotates therewith in a manner to be described. The eccentric arcuate cam surface 215 is duplicated on the opposite side of the drive cam 216 as shown and each such surface terminates in a drop off surface 217 a major portion of which extends along a line at an acute angle to a diameter of the drive cam 216. The arcuate cam surface 215 in each case terminates in a leading edge 218 and onto an inclined minor portion 219 of the drop off surface 217 which has a trailing edge 220 adjacent a notch 221 which is provided for receiving the cam follower 213 at a certain part of the cycle of operation to permit the indexing tooth 192 to disengage the particular ratchet tooth 187 with which it was previously in engagement. It will be observed that each eccentric arcuate cam surface 215 starts with a flat portion 222 which is immediately adjacent the respective notch 221.

It will be understood that the drive cam 216 is secured to the gear 109 which is driven through the gear train 108 by the motor 18 in the manner previously described. Thus the gear 109 and drive cam 216 are secured to the bushing 194 which rotates on the pin 195 and they are driven at a constant speed, for example at 1 r.p.m., in the direction indicated by the arrow 223.

It is desirable that the indexing spring 200 be of such arrangement and construction that it is capable of advancing the indexing lever 193 and thereby through the indexing tooth 192 the ratchet wheel 186 with sufficient force to rotate both of the multiple race cams 33 through the drive gear wheel 183 and driven gear wheels 182 to operate the several switch blades 55 from one position to another for each step. However, care should be taken to limit the force exerted by the indexing spring 200 in order not to adversely affect the switch operating mechanism including the operating pins 78. Also it will be understood that the number of switch blades 55 operated for any given step in the operation of the ratchet wheel 186 may vary depending upon the number of the circuits that are to be controlled at that particular part of the operating cycle. Accordingly, in some cases there may be only one or two of the switch blades 55 operated for a given step in the rotation of the ratchet wheel 186 while at another step there may be several switch blades 55 operated. However, it is undesirable to provide the indexing spring 200 with sufficient stored energy to overcome the maximum resistance that may be encountered when a large number of the switch blades 55 are operated simultaneously. Also, it is undesirable to require that such an amount of energy be stored in the spring 200 through the gear train 108 operated by the relatively small powered motor 18.

It will be appreciated that the indexing spring 200 is delivering its energy for advancing the indexing lever 193 and the ratchet wheel 186 and parts driven thereby at a time when no load is being applied to the motor 18 other than the friction load incident to the operation of the gear train 108 and the rotation of the gear 109 and parts immediately associated therewith. Accordingly, in accordance with this invention advantage is taken of the fact that during this period the motor 18 is not required to deliver energy for storing it in the indexing spring 200 to use the available power for adding to the force exerted by the indexing spring 200 to advance the indexing lever 193 and the ratchet wheel 186 in the event that the energy stored in the indexing spring 200 is insufficient to effect this result.

With a view to providing additional operating force for advancing the indexing lever 193 and the ratchet wheel 186 to effect corresponding operation of the circuit controllers 10 a double lobed booster cam 226, shown more clearly in FIGURE 25, is provided between the gear 109 and the drive cam 216 and is arranged for conjoint rotation therewith. The booster cam 226 has arcuate cam surfaces 227 the trailing edges 228 of which are arranged, under certain circumstances, to engage a cam follower 229 which is mounted on and forms a part of a booster pawl 230 the details of construction of which are shown more clearly in FIGURES 26 and 27 of the drawings. The booster pawl 230 is rotatably mounted on a stud 231, FIGURES 16 and 19, which is carried by the elongated support plate 181 near the lower edge. The booster pawl 230 is provided with an operating arm 232 having a circular end portion 233 that is juxtaposed to the surface 213b of the cam follower 213, as shown in FIGURE 30, with a clearance 234 therebetween. The arrangement is such that, when the indexing spring 200 has sufficient energy stored in it to effect by itself the advance of the indexing lever 193 and ratchet wheel 186 together with operation of the circuit controllers 12, the booster pawl 230 is ineffective to apply any additional operating force to the indexing lever 193. However, as will appear hereinafter, when the energy stored in the indexing spring 200 is insufficient to advance the indexing lever 193 and parts associated therewith, the circular end portion 233 engages the surface 213b and sufficient additional force is applied to advance the indexing lever 193 so that it is capable of performing its intended function.

The operation of the dual lateral controller 180, shown in FIGURE 16 of the drawings, can be understood more clearly by reference to FIGURES 28–31 where different positions of the operating mechanism are illustrated, it being assumed that sufficient energy is stored in the indexing spring 200 to effect the desired advance of the ratchet wheel 186 and parts driven thereby. The motor 18 drives through the gear train 108 to rotate the gear 109 and therewith the drive cam 216 in the direction indicated by the arrow 223. One of the eccentric arcuate cam surfaces 215 engages the side 213a of the cam follower 213 and causes the indexing lever 193 to be retracted in the direction indicated by the arrow 235. It is guided in this movement by engagement of the underside 191 of the indexing tooth 192 with the arcuate side 189 of the opening 188. This movement of the indexing lever 193 with the indexing tooth 192 out of engagement with the ratchet teeth 187 is transmitted through the link 203 to the indexing spring 200 which is compressed by having energy stored therein as indicated in FIGURE 29. Maximum energy is stored in the indexing spring 200 when the leading edge 218 of the operating cam surface 215 engages the surface 213a of the cam follower 213. Continued rotation of the drive cam 216 in the direction indicated by the arrow 223 causes the cam follower 213 to pass the leading edge 218 and to move its beveled end 214 downwardly along the inclined position 219 of the drop off surface 217. As a result of this movement of the cam follower 213 the indexing lever 193 is rotated about the pivot axis 199 to move the indexing tooth 192 into engagement with the next ratchet tooth 187 on the ratchet wheel 186 as shown in FIGURE 30. At the same time the indexing lever 193 begins to advance in the direction indicated by the arrow 236 toward the pivot axis 199 as the result of the energy stored in the indexing spring 200. The indexing lever 193 continues to move in the direction indicated by the arrow 236, as shown in FIGURE 31, until the surface 213a of the cam follower 213 engages the flat portion 222 at the end of the eccentric arcuate cam surface 215 that has been operative previously for the preceding advance of the indexing lever 193. Thus, the continued rotation of the drive cam 216 in the direction indicated by the arrow 223 permits the cam follower 213 to move off of the drop off surface 217 beyond the trailing edge 220 and onto the flat portion 222 where further advance of the indexing lever 193 is prevented. As a result of the advance of the indexing lever 193 in the direction indicated by the arrow 236, the ratchet wheel 186 is rotated in the direction indicated by the arrow 237 on FIGURE 31 a corresponding extent.

Under the conditions assumed where the indexing spring 200 has sufficient energy stored in it to advance the indexing lever 193 and rotate the ratchet wheel 186 through a complete cycle, the booster pawl 230 is ineffective. The reason for this will be apparent from a consideration of FIGURES 29, 30 and 31. In FIGURE 29 a clearance 234' is maintained between the cam follower 229 and the associated arcuate cam surface 227 of the booster cam 226. As the indexing lever 193 is retracted, the circular end portion 233 of the operating arm 232 on the booster pawl 230 is engaged by the surface 213b and the booster pawl 230 is rocked in a counterclockwise direction. Now when the indexing lever 193 is moved in the direction indicated by the arrow 236 under the influence of the indexing spring 200, as shown in FIGURE 30, the clearance 234 is maintained between the circular end portion 233 and the adjacent surface 213b of the cam follower 213 while the booster pawl 230 is being rocked in a clockwise direction as the result of the cam follower 229 thereon being moved by the arcuate cam surface 227 of the booster cam 226. The clearance 234 is maintained, as shown in FIGURE 31, as the indexing lever 193 completes its full forward stroke under the influence of the energy stored in the indexing spring 200.

When the load on the ratchet wheel 186 is greater than can be carried by the energy stored in the indexing spring 200, the booster pawl 230 is operative to add to the force exerted by the indexing spring 200 as shown in FIGURE 32 of the drawings. Here it will be observed that the operating force from the indexing spring 200 is transmitted through the link 203 to the indexing lever 193 along a line 238 extending between the notch 208 and the pivot axis 199. During the time that the indexing lever 193 is advancing in the direction indicated by the arrow 236, the indexing tooth 192 is held in engagement with one of the ratchet teeth 187 because the cam follower 213 is moving downwardly along the drop off surface 217 on the drive cam 216. Under the assumed conditions where the energy stored in the indexing spring 200 is insufficient to complete the advance of the indexing lever 193, the booster cam 226 rotates the booster pawl 230 in a clockwise direction and causes the circular end portion 233 on the operating arm 232 to engage the surface 213b of the cam follower 213. As pointed out hereinbefore and as is apparent from FIGURE 32 of the drawings, at this time the load on the motor 18 is only the friction load of the gear train 108 and associated parts with the result that sufficient energy is available from the motor 18 to rotate the booster cam 226 during this portion of the operating cycle to complete the advance of the indexing lever 193.

It is desirable that the force exerted by the booster pawl 230 on the indexing lever 193 be such as to tend to hold the indexing tooth 192 in engagement with the ratchet tooth 187. As shown in FIGURE 32 the force exerted by the operating arm 232 is directed along a line 239 above the line 238 and spaced from the pivot axis 199 so that a moment is applied to the indexing lever 193 about the pivot axis 199 which tends to rotate the indexing lever 193 in a clockwise direction and to hold the indexing tooth 192 in engagement with the tooth 187 of the ratchet wheel 186.

After the indexing lever 193 has been fully advanced either by the indexing spring 200 alone or by it in combination with the additional force exerted through the booster pawl 230, the cam follower 213 is prevented from further advance by the flat portion 222 of the arcuate cam surface 215. Here the cam follower 213 is in registry with the notch 221 and the indexing lever 193 is swung under the influence of the indexing spring 200 in a counterclockwise direction sufficiently far to move the indexing tooth 192 out of engagement with the particular ratchet tooth 187 with which it had previously been in engagement. The operating cycle then is repeated with the indexing lever 193 being retracted in the direction indicated by the arrow 235.

FIGURE 33 of the drawings shows how the operating mechanism illustrated in FIGURE 16 and described hereinbefore employing the booster cam 226 and booster pawl 230 can be used in conjunction with a single circuit controller 12 mounted on a support plate 240. Here the parts of the operating mechanism previously described are used and the indexing spring 200 is arranged to react at its left end against a lug 241 which is struck up from the support plate 240. The same gear train 108 is used and it is located somewhat differently than it is positioned on the elongated support plate 181 since the indexing lever 193 is located near the upper side of the support plate 240 and the indexing tooth 192 is arranged to engage a ratchet tooth 89 of the ratchet wheel 88 which, as described previously in connection with FIGURE 5 of the drawings, is secured to the multiple race cam 33. Since only a single circuit controller 12 is employed, a lighter spring 200 can be used for the indexing spring than is used in the construction shown in FIGURE 16 where two circuit controllers 12 are operated.

In order to prevent reverse rotation of the ratchet wheel 186 in FIGURE 16 or the ratchet wheel 88 shown in FIGURE 33, the holding spring 165, shown in FIGURES 9 to 13, can be employed. In order to avoid further and unnecessary complication, of FIGURES 16 and 33 of the drawings the holding spring 165 is not illustrated thereon.

In the construction shown in FIGURE 33 of the drawings the indexing lever 193 is guided in the retracting direction indicated by the arrow 235 by the upper side 242 of the indexing tooth 192 engaging the arcuate upper side 243 of an opening 244 in the support plate 240. It will be understood that the center of curvature of the arcuate side 243 is the operating axis 21 of the circuit controller 12.

During the operation of the ratchet devices shown in FIGURES 9, 16 and 33 of the drawings it may be necessary to rotate the ratchet wheel 88 or 186 in order to shift the operated device, such as the circuit controller 12, to a position beyond the position to which it is operable by the motor 18 through the associated gear train 108. For such operation the holding spring 165 is not used. Such operation can be had by manually rotating the shaft 20 or shafts 20, as the case may be, in either direction by rotation of the dial 11 or knob 185. Should the operation in this manner take place in a direction opposite to the direction in which the indexing lever 149 or 193 is advancing the ratchet wheel 88 or 186, the respective cam follower 148 or 213 is raised out of engagement with its cam 143 or 215 whereupon the indexing spring 159 or 200 moves the indexing tooth 151 or 192 out of engagement with a tooth 89 or 187 of the respective ratchet wheel 88 or 186. Thus it is possible to rotate the ratchet wheel 88 or 186 in either direction at any time regardless of the particular time in the operating cycle that such rotation is accomplished.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In a circuit controller, in combination, contact means, a support therefor, a ratchet wheel rotatable on said support about an axis and arranged and constructed to move said contact means from one position to another, an indexing lever endwise slidable and pivotally mounted on said support about a pivot axis and parallel to and spaced to one side away from said axis and carrying an indexing tooth for engaging a tooth of said ratchet wheel, said indexing lever having a cam follower, index spring means acting generally lengthwise of said indexing lever and biasing it toward said pivot axis, a cam rotatable on said support about said pivot axis and having an eccentric arcuate cam surface for engaging said cam follower to retract said indexing lever and thereby said indexing tooth and to tension said index spring means, said cam having a drop off surface along which said cam follower is movable under the influence of said index spring means to advance said indexing lever and thereby said indexing tooth to advance said ratchet wheel in a stepwise manner and operate said contact means, and motor means operatively connected to said cam for rotating it.

2. In a circuit controller, in combination, contact means, a support therefor, a ratchet wheel rotatable on said support about an axis and arranged and constructed to move said contact means from one position to another, an indexing lever endwise slidable and pivotally mounted on said support about a pivot axis parallel to and spaced to one side away from said axis and carrying an indexing tooth for engaging a tooth of said ratchet wheel, said indexing lever having a cam follower, a link reacting generally endwise against said indexing lever and toward said pivot axis, index spring means reacting against said link to bias said indexing lever toward said pivot axis, a cam rotatable on said support about said pivot axis and having an eccentric arcuate cam surface for engaging said cam follower to retract said indexing lever and thereby said indexing tooth and to tension said index spring means, said cam having a drop off surface along which said cam follower is movable under the influence of said index spring means to advance said indexing lever and thereby said indexing tooth to advance said ratchet wheel in a stepwise manner and operate said contact means, and motor means operatively connected to said cam for rotating it.

3. In a circuit controller, in combination, contact means, a support therefor, a ratchet wheel rotatable on said support about an axis and arranged and constructed to move said contact means from one position to another, an indexing lever endwise slidable and pivotally mounted on said support about a pivot axis parallel to and spaced to one side away from said axis and carrying an indexing tooth for engaging a tooth of said ratchet wheel, said indexing lever having a cam follower index spring means acting generally lengthwise of said indexing lever and biasing it toward said pivot axis, a cam rotatable on said support about said pivot axis and having an eccentric arcuate cam surface for engaging said cam follower to retract said indexing lever and thereby said indexing tooth and to tension said index spring means, said cam having a drop off surface along which said cam follower is movable from a leading end to a trailing end under the influence of said index spring means to advance said indexing lever and thereby said indexing tooth to advance said ratchet wheel in a stepwise manner and operate said contact means, said cam having a notch extending transversely of said drop off surface at the trailing end thereof to receive said cam follower and allow said indexing lever to rotate about said pivot axis under the influence of said index spring means and move said indexing tooth out of operative engagement with said ratchet wheel, and motor means operatively connected to said cam for rotating it.

4. In a circuit controller, in combination, contact means, a support therefor, a ratchet wheel rotatable on said support about an axis and arranged and constructed to move said contact means from one position to another, an indexing lever endwise slidable and pivotally mounted on said support about a pivot axis parallel to and spaced to one side away from said axis and carrying an indexing tooth for engaging a tooth of said ratchet wheel, said indexing lever having a cam follower, index spring means acting generally lengthwise of said indexing lever and biasing it toward said pivot axis, a cam rotatable on said support about said pivot axis and having an eccentric arcuate cam surface for engaging said cam follower to retract said indexing lever and thereby said indexing tooth and to tension said index spring means, said cam having an inclined drop off surface as a continuation of said eccentric arcuate cam surface along which said cam follower is movable under the influence of said index spring means to rotate said indexing lever about said pivot axis and move said indexing tooth into operating engagement with said ratchet wheel and to advance said indexing lever to advance said ratchet wheel in a stepwise manner and operate said contact means, and motor means operatively connected to said cam for rotating it.

5. In a circuit controller, in combination, contact means, a support therefor, a ratchet wheel rotatable on said support about an axis and arranged and constructed to move said contact means from one position to another, an indexing lever endwise slidable and pivotally mounted on said support about a pivot axis parallel to and spaced to one side away from said axis and carrying an indexing tooth for engaging a tooth of said ratchet wheel, said indexing lever having a cam follower, index spring means acting generally lengthwise of said indexing lever and biasing it toward said pivot axis, a cam rotatable on said support about said pivot axis and having an eccentric arcuate cam surface for engaging said cam follower to retract said indexing lever and thereby said indexing tooth and to tension said index spring means, said cam having an inclined drop off surface as a continuation of said eccentric arcuate cam surface along which said cam follower is movable under the influence of said index spring means to rotate said indexing lever about said pivot axis and move said indexing tooth into operative engagement with said ratchet wheel and to advance said indexing lever to advance said ratchet wheel in a stepwise manner and operate said contact means, said cam having a notch extending transversely of said drop off surface at the trailing end thereof to receive said cam follower and allow said indexing lever to rotate about said pivot axis under the influence of said index spring means and move said indexing tooth out of operative engagement with said ratchet wheel, and motor means operatively connected to said cam for rotating it.

6. In a circuit controller, in combination, contact means, a ratchet wheel rotatable about an axis and arranged and constructed to move said contact means from one position to another, a plate in parallel juxtaposed relation to said ratchet wheel having one side facing the same and its other side facing in the opposite direction, an indexing lever endwise slidable and pivotally mounted on said other side of said plate about a pivot axis parallel to and spaced to one side away from said axis and carrying an indexing tooth extending through a slotted opening in said plate for engaging a tooth on said ratchet wheel, said indexing lever having a cam follower extending in a direction opposite to that in which said indexing tooth extends, a link reacting generally endwise against said indexing lever and generally toward said pivot axis, index spring means reacting between said plate and said link and biasing it toward said pivot axis, a cam rotatably mounted on the front side of said plate about said pivot axis and having an eccentric arcuate cam surface engaging said cam follower to retract said indexing lever and thereby said indexing tooth and to tension said index spring means, said cam having a drop off surface along which said cam follower is movable under the influence of said index spring means to advance said indexing lever and thereby said indexing tooth to advance said ratchet wheel in a stepwise manner, and motor means operatively connected to said cam for rotating it at a constant speed.

7. A circuit controller comprising, in combination, a pair of switch plates disposed in parallel spaced relation along an operating axis, contacts on the juxtaposed sides of said plates in arcuate spaced relation along circles the centers of which lie along said operating axis, switch blades extending radially of said operating axis and movably mounted at their inner ends between said plates with their outer ends aligned with certain of said contacts for engaging and disengaging them, spring means urging said switch blades away from one switch plate toward the other switch plate, an operating pin operatively engaging at one end each switch blade and extending transversely of and slidable on said other switch plate parallel to said operating axis, a cam plate in parallel juxtaposed relation to said other switch plate on the side away from said one switch plate, means rotatably mounting said cam plate about said operating axis, cam race means on said cam plate engageable with the other ends of said operating pins, a ratchet wheel, driving means between said ratchet wheel and plate, a support plate in parallel juxtaposed relation to said ratchet wheel having its rear side facing the same and its front side facing in the opposite direction and mounting said ratchet wheel for rotation about an axis, an indexing lever endwise slidable and pivotally mounted on said front side of said support plate about a pivot axis parallel to and spaced to one side away from said axis of rotation of said ratchet wheel and carrying an indexing tooth extending through a slotted opening in said support plate for engaging a tooth on said ratchet wheel, said indexing lever having a cam follower extending in a direction opposite to that in which said indexing tooth extends, a link reacting generally endwise against said indexing lever and generally toward said pivot axis, index spring means reacting between said support plate and said link generally toward said pivot axis, a cam rotatably mounted on said front side of said support plate about said pivot axis and having an eccentric arcuate cam surface engaging said cam follower to retract said indexing lever and thereby said indexing tooth and tension said index spring means, said cam having a drop off surface along which said cam follower is movable under the influence of said index spring means to advance said indexing lever and thereby said indexing tooth to advance said ratchet wheel and therewith said cam plate in a stepwise manner, and motor means operatively connected to said cam for rotating it at a constant speed.

8. A circuit controller comprising, in combination, a pair of switch plates disposed in parallel spaced relation along an operating axis, contacts on the juxtaposed sides of said plates in arcuate spaced relation along circles the centers of which lie along said operating axis, switch blades extending radially of said operating axis and movably mounted at their inner ends between said plates with their outer ends aligned with certain of said contacts for engaging and disengaging them, spring means urging said switch blades away from one switch plate toward the other switch plate, an operating pin operatively engaging at one end each switch blade and extending transversely of and slidable on said other switch plate parallel to said operating axis, a cam plate in parallel juxtaposed relation to said other switch plate on the side away from said one switch plate, means rotatably mounting said cam plate about said operating axis, cam race means on said cam plate engageable with the other ends of said operating pins, a ratchet wheel secured to said cam plate on the side away from said other switch plate and rotatable therewith about said operating axis, a support plate in parallel juxtaposed relation to said ratchet wheel having its rear side facing the same and its front side facing in the opposite direction, an indexing lever endwise slidable and pivotally mounted on said front side of said support plate about a pivot axis parallel to and spaced to one side away from said operating axis and carrying an indexing tooth extending through a slotted opening in said support plate for engaging a tooth on said ratchet wheel, said indexing lever having a cam follower extending in a direction opposite to that in which said indexing tooth extends, a link reacting generally endwise against said indexing lever and generally toward said pivot axis, index spring means reacting between said support plate and said link generally toward said pivot axis, a cam rotatably mounted on said front side of said support plate about said pivot axis and having an eccentric arcuate cam surface engaging said cam follower to retract said indexing lever and thereby said indexing tooth and tension said index spring means, said cam having a drop off surface along which said cam follower is movable under the influence of said index spring means to advance said indexing lever and thereby said indexing tooth to advance said ratchet wheel and therewith said cam plate in a stepwise manner, and motor means operatively connected to said cam for rotating it at a constant speed.

9. The invention, as set forth in claim 8, wherein the cam follower engages a part of the cam to limit the advance of the indexing tooth and thereby the advance of the ratchet wheel and cam plate.

10. The invention, as set forth in claim 8, wherein a wire spring in the form of a loop is secured at one end to the front side of the support plate and overlies the same with the major portion being free to flex and having its other end extending at right angles through a slotted opening in said support plate and into engagement with a tooth on the ratchet wheel to prevent reverse rotation thereof.

11. The invention, as set forth in claim 10, wherein that portion of the support plate through which the other end of the wire spring reacts is located in overlying relation to said wire spring whereby the force applied by a tooth of the ratchet wheel to said other end of said wire spring acts principally in shear.

12. The invention, as set forth in claim 8, wherein the index spring means is a coil spring disposed about an axis parallel to and spaced to the other side away from the operating axis with one end extending tangentially and reacting against a lug extending from the support plate and the other end extending tangentially and reacting against the other end of the link.

13. In a circuit controller, in combination, contact means, a support therefor, a ratchet wheel rotatably mounted on said support and arranged and constructed to move said contact means from one position to another, indexing means on said support cooperating with said ratchet wheel, spring means interposed between said support and said indexing means for advancing the latter and thereby said ratchet wheel to operate said contact means, cam means cooperating with said indexing means, and means operable conjointly with said cam means for positively advancing said indexing means and said ratchet wheel when insufficient energy is stored in said spring means to effect such advance.

14. In a circuit controller, in combination, contact means, a support therefor, a ratchet wheel rotatably mounted on said support and arranged and constructed to move said contact means from one position to another, indexing means on said support cooperating with said ratchet wheel, spring means interposed between said support and said indexing means for advancing the latter and thereby said ratchet wheel to operate said contact means, a drive cam rotatably mounted on said support and cooperating with said indexing means to retract it and store energy in said spring means, a booster pawl rotatably mounted on said support and cooperating with said indexing means, a booster cam operable conjointly with said drive cam and cooperating with said booster pawl for positively advancing said indexing means and said ratchet wheel when insufficient energy is stored in said spring means to effect such advance, and a motor operatively connected to said drive cam and said booster cam for rotating them.

15. In a circuit controller, in combination, contact means, a support therefor, a ratchet wheel rotatably mounted on said support and arranged and constructed to move said contact means from one position to another, indexing means on said support cooperating with said ratchet wheel, spring means interposed between said support and said indexing means for advancing the latter and thereby said ratchet wheel to operate said contact means and for biasing said indexing means away from said ratchet wheel, a drive cam rotatably mounted on said support and cooperating with said indexing means to retract it and store energy in said spring means during a part of its revolution and during another part of its revolution said drive cam acting to move said indexing means into operative relation with said ratchet wheel for operation thereof as aforesaid by said spring means, a motor operatively connected to said drive cam for rotating it, and means driven by said motor and operable after said other part of a revolution of said drive cam has been completed for positively advancing said indexing means and said ratchet wheel when insufficient energy is stored in said spring means to effect such advance by itself.

16. In a circuit controller, in combination, contact means, a support therefor, a ratchet wheel rotatably mounted on said support and arranged and constructed to move said contact means from one position to another, indexing means on said support cooperating with said ratchet wheel, spring means interposed between said support and said indexing means for advancing the latter and thereby said ratchet wheel to operate said contact means and for biasing said indexing means away from said ratchet wheel, a drive cam rotatably mounted on said support and cooperating with said indexing means to retract it and store energy in said spring means during a part of its revolution and during another part of its revolution said drive cam acting to move said indexing means into operative relation with said ratchet wheel for operation thereof as aforesaid by said spring means, a motor operatively connected to said drive cam for rotating it, a booster pawl rotatably mounted on said support and cooperating with said indexing means, and a booster cam driven by said motor and cooperating with said booster pawl after said other part of a revolution of said drive cam has been completed for positively advancing said indexing means and said ratchet wheel when insufficient energy is stored in said spring means acting alone to effect such advance.

17. In a circuit controller, in combination, contact means, a support therefor, a ratchet wheel rotatably mounted on said support and arranged and constructed to move said contact means from one position to another, indexing means on said support cooperating with said ratchet wheel, spring means interposed between said support and said indexing means for advancing the latter and thereby said ratchet wheel to operate said contact means and for biasing said indexing means away from said ratchet wheel, a drive cam rotatably mounted on said support and cooperating with said indexing means to retract it and store energy in said spring means during a part of its revolution and during another part of its revolution said drive cam acting to move said indexing means into operative relation with said ratchet wheel for operation thereof as aforesaid by said spring means, a motor operatively connected to said drive cam for rotating it, a booster pawl rotatably mounted on said support and cooperating with said indexing means, and a booster cam driven by said motor and cooperating with said booster pawl after said other part of a revolution of said drive cam has been completed for positively advancing said indexing means and said ratchet wheel when insufficient energy is stored in said spring means acting alone to effect such advance, the reaction between said booster pawl and said indexing means being such as to urge the latter into operative engagement with said ratchet wheel.

18. In a circuit controller, in combination, a support, a pair of circuit control devices mounted in spaced relation on said support, a ratchet wheel rotatably mounted on said support, driving means between said pair of circuit control devices and said ratchet wheel to effect simultaneous operation thereof on rotation of said ratchet wheel, indexing means on said support cooperating with said ratchet wheel, spring means interposed between said support and said indexing means for advancing the latter and thereby said ratchet wheel to operate said circuit control devices as aforesaid, cam means on said support cooperating with said indexing means for retracting the same and storing energy in said spring means, and a motor operatively connected to said cam means.

19. In a circuit controller, in combination, a support, a pair of circuit control devices mounted in spaced relation on said support, a ratchet wheel rotatably mounted on said support, driving means between said pair of circuit control devices and said ratchet wheel to effect simultaneous operation thereof on rotation of said ratchet wheel, indexing means on said support cooperating with said ratchet wheel, spring means interposed between said support and said indexing means for advancing the latter and thereby said ratchet wheel to operate said circuit control devices as aforesaid, cam means on said support cooperating with said indexing means for retracting the same and storing energy in said spring means, booster means cooperating with said indexing means for positively advancing the same and said ratchest wheel when insufficient energy is stored in said spring means to effect such advance, and a motor operatively connected to said cam means and to said booster means.

20. In a circuit controller, in combination, a support, a pair of circuit control devices mounted in spaced relation on said support, a ratchet wheel rotatably mounted on said support, driving means between said pair of circuit control devices and said ratchet wheel to effect simultaneous operation thereof on rotation of said ratchet wheel, indexing means on said support cooperating with said ratchet wheel, spring means interposed between said support and said indexing means for advancing the latter and thereby said ratchet wheel to operate said circuit control devices as aforesaid, a drive cam rotatably mounted on said support and cooperating with said indexing means to retract it and store energy in said spring means, a booster pawl rotatably mounted on said support and cooperating with said indexing means, a booster cam operable conjointly with said drive cam and cooperating with said booster pawl for positively advancing said indexing means and said ratchet wheel when insufficient energy is stored in said spring means to effect such advance, and a motor operatively connected to said drive cam and said booster cam for rotating them.

21. In a circuit controller, in combination, a support, a pair of circuit control devices mounted in spaced relation on said support, a ratchet wheel rotatably mounted on said support, driving means between said pair of circuit control devices and said ratchet wheel to effect simultaneous operation thereof on rotation of said ratchet wheel, indexing means on said support cooperating with said ratchet wheel, spring means interposed between said support and said indexing means for advancing the latter and thereby said ratchet wheel to operate said circuit control devices and for biasing said indexing means away from said ratchet wheel, a drive cam rotatably mounted on said support and coopearting with said indexing means to retract it and store energy in said spring means during a part of its revolution and during another part of its revolution said drive cam acting to move said indexing means into operative relation with said ratchet wheel for operation thereof as aforesaid by said spring means, a motor operatively connected to said drive cam for rotating it, and means driven by said motor and operable after said other part of a revolution of said drive cam has been completed for positively advancing said indexing means and said ratchet wheel when insufficient energy is stored in said spring means to effect such advance by itself.

22. In a circuit controller, in combination, a support, a pair of circuit control devices mounted in spaced relation on said support, a ratchet wheel rotatably mounted on said support, driving means between said pair of circuit control devices and said ratchet wheel to effect simultaneous operation thereof on rotation of said ratchet wheel, indexing means on said support cooperating with said ratchet wheel, spring means interposed between said support and said indexing means for advancing the latter and thereby said ratchet wheel to operate said circuit control devices and for biasing said indexing means away from said ratchet wheel, a drive cam rotatably mounted on said support and cooperating with said indexing means to retract it and store energy in said spring means during a part of its revolution and during another part of its revolution said drive cam acting to move said indexing means into operative relation with said ratchet wheel for operation thereof as aforesaid by said spring means, a motor operatively connected to said drive cam for rotating it, a booster pawl rotatably mounted on said support and cooperating with said indexing means, and a booster cam driven by said motor and cooperating with said booster pawl after said other part of a revolution of said drive cam has been completed for positively advancing said indexing means and said ratchet wheel when insufficient energy is stored in said spring means acting alone to effect such advance.

23. A circuit controller comprising, in combination, a support plate, a pair of circuit control devices mounted in spaced relation on one side of said support plate; each circuit control device comprising a pair of switch plates disposed in parallel spaced relation along an operating axis, contacts on the juxtaposed sides of said plates in arcuate spaced relation along circles the centers of which lie along said operating axis, switch blades extending radially of said operating axis and movably mounted at their inner ends between said plates with their outer ends aligned with certain of said contacts for engaging and disengaging them, spring means urging said switch blades away from one switch plate toward the other switch plate, an operating pin operatively engaging at one end each switch blade and extending transversely of and slidable on said other switch plate parallel to said operating axis, a cam plate in parallel juxtaposed relation to said other switch plate on the side away from said one switch plate, means rotatably mounting said cam plate about said operating axis, cam race means on one side of said cam plate engageable with the other ends of said operating pins, and a driven gear wheel secured to the other side of said cam plate and rotatable therewith about said operating axis; said support plate having its rear side in parallel juxtaposed relation to each driven gear wheel, a drive gear wheel having driving connection with each driven gear wheel and rotatably mounted on said support plate about an axis, a ratchet wheel secured to said drive gear wheel and rotatable therewith about its axis of rotation, indexing means on the front side of said support plate cooperating with said ratchet wheel, spring means interposed between said support plate and said indexing means for advancing the latter and thereby said ratchet wheel to operate said pair of circuit control devices, cam means on said front side of said support plate cooperating with said indexing means for retracting the same and storing energy in said spring means, and a motor operatively connected to said cam means.

24. A circuit controller comprising, in combination, a support plate, a pair of circuit control devices mounted in spaced relation on one side of said support plate; each circuit control device comprising a pair of switch plates disposed in parallel spaced relation along an operating axis, contacts on the juxtaposed sides of said plates in arcuate spaced relation along circles the centers of which lie along said operating axis, switch blades extending radially of said operating axis and movably mounted at their inner ends between said plates with their outer ends aligned with certain of said contacts for engaging and disengaging them, spring means urging said switch blades away from one switch plate toward the other switch plate, an operating pin operatively engaging at one end each switch blade and extending transversely of and slidable on said other switch plate parallel to said operating axis, a cam plate in parallel juxtaposed relation to said other switch plate on the side away from said one switch plate, means rotatably mounting said cam plate about said operating axis, cam race means on one side of said cam plate engageable with the other ends of said operating pins, and a driven gear wheel secured to the other side of said cam plate and rotatable therewith about said operating axis; said support plate having its rear side in parallel juxtaposed relation to each driven gear wheel, a drive gear wheel having driving connection with each driven gear wheel and rotatably mounted on said support plate about an axis, a ratchet wheel secured to said drive gear wheel and rotatable therewith about its axis of rotation, indexing means on the front side of said support plate cooperating with said ratchet wheel, spring means interposed between said support plate and said indexing means for advancing the latter and thereby said ratchet wheel to operate said pair of circuit control devices, cam means on said front side of said support plate cooperating with said indexing means for retracting the same and storing energy in said spring means, booster means cooperating with said indexing means for positively advancing the same and said ratchet wheel when insufficient energy is stored in said spring means to effect such advance, and a motor operatively connected to said cam means and to said booster means.

25. A circuit controller comprising, in combination, a support plate, a pair of circuit control devices mounted in spaced relation on one side of said support plate; each circuit control device comprising a pair of switch plates disposed in parallel spaced relation along an operating axis, contacts on the juxtaposed sides of said plates in arcuate spaced relation along circles the centers of which lie along said operating axis, switch blades extending radially of said operating axis and movably mounted at their inner ends between said plates with their outer ends aligned with certain of said contacts for engaging and disengaging them, spring means urging said switch blades away from one switch plate toward the other switch plate, an operating pin operatively engaging at one end each switch blade and extending transversely of and slidable on said other switch plate parallel to said operating axis, a cam plate in parallel juxtaposed relation to said other switch plate on the side away from said one switch plate, means rotatably mounting said cam plate about said operating axis, cam race means on one side of said cam plate engageable with the other ends of said operating pins, and a driven gear wheel secured to the other side of said cam plate and rotatable therewith about said operating axis; said support plate having its rear side in parallel juxtaposed relation to each driven gear wheel, a drive gear wheel having driving connection with each driven gear wheel and rotatably mounted on said support plate about an axis, a ratchet wheel secured to said drive gear wheel and rotatable therewith about its axis of rotation, indexing means on the front side of said support plate cooperating with said ratchet wheel, spring means interposed between said support plate and said indexing means for advancing the latter and thereby said ratchet wheel to operate said pair of circuit control devices, a drive cam rotatably mounted on said front side of said support plate and cooperating with said indexing means to retract it and store energy in said spring means, a booster pawl rotatably mounted on said front side of said support plate and cooperating with said indexing means, a booster cam operable conjointly with said drive cam and cooperating with said booster pawl for positively advancing said indexing means and said ratchet wheel when insufficient energy is stored in said spring means to effect such advance, and a motor operatively connected to said drive cam and said booster cam for rotating them.

26. A circuit controller comprising, in combination, a support plate, a pair of circuit control devices mounted in spaced relation on one side of said support plate; each circuit control device comprising a pair of switch plates disposed in parallel spaced relation along an operating axis, contacts on the juxtaposed sides of said plates in arcuate spaced relation along circles the centers of which lie along said operating axis, switch blades extending radially of said operating axis and movably mounted at their inner ends between said plates with their outer ends aligned with certain of said contacts for engaging and disengaging them, spring means urging said switch blades away from one switch plate toward the other switch plate, an operating pin operatively engaging at one end each switch blade and extending transversely of and slidable on said other switch plate parallel to said operating axis, a cam plate in parallel juxtaposed relation to said other switch plate on the side away from said one switch plate, means rotatably mounting said cam plate about said operating axis, cam race means on one side of said cam plate engageable with the other ends of said operating pins, and a driven gear wheel secured to the other side of said cam plate and rotatable therewith about said operating axis; said support plate having its rear side in parallel juxtaposed relation to each driven gear wheel, a drive gear wheel having driving connection with each driven gear wheel and rotatably mounted on said support plate about an axis, a ratchet wheel secured to said drive gear wheel and rotatable therewith about its axis of rotation, indexing means on the front side of said support plate cooperating with said ratchet wheel, spring means interposed between said support plate and said indexing means for advancing the latter and thereby said ratchet wheel to operate said circuit control devices and for biasing said indexing means away from said ratchet wheel, a drive cam rotatably mounted on said support and cooperating with said indexing means to retract it and store energy in said spring means during a part of its revolution and during another part of its revolution said drive cam acting to move said indexing means into operative relation with said ratchet wheel for operation thereof as aforesaid by said spring means, a motor operatively connected to said drive cam for rotating it, and means driven by said motor and operable after said other part of a revolution of said drive cam has been completed for positively advancing said indexing means and said ratchet wheel when insufficient energy is stored in said spring means to effect such advance by itself.

27. A circuit controller comprising, in combination, a support plate, a pair of circuit control devices mounted in spaced relation on one side of said support plate; each circuit control device comprising a pair of switch plates disposed in parallel spaced relation along an operating axis, contacts on the juxtaposed sides of said plates in arcuate spaced relation along circles the centers of which lie along said operating axis, switch blades extending radially of said operating axis and movably mounted at their inner ends between said plates with their outer ends aligned with certain of said contacts for engaging and disengaging them, spring means urging said switch blades away from one switch plate toward the other switch plate, an operating pin operatively engaging at one end each switch blade and extending transversely of and slidable on said other switch plate parallel to said operating axis, a cam plate in parallel juxtaposed relation to said other switch plate on the side away from said one switch plate, means rotatably mounting said cam plate about said operating axis, cam race means on one side of said cam plate engageable with the other ends of said operating pins, and a driven gear wheel secured to the other side of said cam plate and rotatable therewith about said operating axis; said support plate having its rear side in parallel juxtaposed relation to each driven gear wheel, a drive gear wheel having driving connection with each driven gear wheel and rotatably mounted on said support plate about an axis, a ratchet wheel secured to said drive gear wheel and rotatable therewith about its axis of rotation, indexing means on the front side of said support plate cooperating with said ratchet wheel, spring means interposed between said support plate and said indexing means for advancing the latter and thereby said ratchet wheel to operate said circuit control devices and for biasing said indexing means away from said ratchet wheel, a drive cam rotatably mounted on said support and cooperating with said indexing means to retract it and store energy in said spring means during a part of its revolution and during another part of its revolution said drive cam acting to move said indexing means into operative relation with said ratchet wheel for operation thereof as aforesaid by said spring means, a motor operatively connected to said drive cam for rotating it, a booster pawl rotatably mounted on said front side of said support plate and cooperating with said indexing means, and a booster cam driven by said motor and cooperating with said booster pawl after said other part of a revolution of said drive cam has been completed for positively advancing said indexing means and said ratchet wheel when insufficient energy is stored in said spring means acting alone to effect such advance.

28. A ratchet drive mechanism comprising, in combination, driven means, a support, a ratchet wheel rotatable on said support about an axis and arranged and constructed to move said driven means from one position to another, an indexing lever endwise slidable and pivotally mounted on said support about a pivot axis and parallel to and spaced to one side away from said axis of said ratchet wheel and carrying an indexing tooth for engaging a tooth of said ratchet wheel, said indexing lever having a cam follower, index spring means acting generally lengthwise of said indexing lever and biasing it toward said pivot axis, a cam rotatable on said support about said pivot axis and having an eccentric arcuate cam surface for engaging said cam follower to retract said indexing lever and thereby said indexing tooth and to tension said index spring means, said cam having a drop off surface along which said cam follower is movable under the influence of said index spring means to advance said indexing lever and thereby said indexing tooth to advance said ratchet wheel in a stepwise manner and operate said driven means, and motor means operatively connected to said cam for rotating it.

29. A ratchet drive mechanism comprising, in combination, driven means, a support, a ratchet wheel rotatable on said support about an axis and arranged and constructed to move said driven means from one position to another, an indexing lever endwise slidable and pivotally mounted on said support about a pivot axis parallel to and spaced to one side away from said axis of said ratchet wheel and carrying an indexing tooth for engaging a tooth of said ratchet wheel, said indexing lever having a cam follower, a link reacting generally endwise against said indexing lever and toward said pivot axis, index spring means reacting against said link to bias said indexing lever toward said pivot axis, a cam rotatable on said support about said pivot axis and having an eccentric arcuate cam surface for engaging said cam follower to retract said indexing lever and thereby said indexing tooth and to tension said index spring means, said cam having a drop off surface along which said cam follower is movable under the influence of said index spring means to advance said indexing lever and thereby said indexing tooth to advance said ratchet wheel in a stepwise manner and operate said driven means, and motor means operatively connected to said cam for rotating it.

30. A ratchet drive mechanism comprising, in combination, driven means, a support therefor, a ratchet wheel rotatable on said support about an axis and arranged and constructed to move said driven means from one position to another, an indexing lever endwise slidable and pivotally mounted on said support about a pivot axis parallel to and spaced to one side away from said axis of said ratchet wheel and carrying an indexing tooth for engaging a tooth of said ratchet wheel, said indexing lever having a cam follower, index spring means acting generally lengthwise of said indexing lever and biasing it toward said pivot axis, a cam rotatable on said support about said pivot axis and having an eccentric arcuate cam surface for engaging said cam follower to retract said indexing lever and thereby said indexing tooth and to tension said index spring means, said cam having a drop off surface along which said cam follower is movable from a leading end to a trailing end under the influence of said index spring means to advance said indexing lever and thereby said indexing tooth to advance said ratchet wheel in a stepwise manner and operate said driven means, said cam having a notch extending transversely of said drop off surface at the trailing end thereof to receive said cam follower and allow said indexing lever to rotate about said pivot axis under the influence of said index spring means and move said indexing tooth out of operative engagement with said ratchet wheel, and motor means operatively connected to said cam for rotating it.

31. A ratchet drive mechanism comprising, in combination, driven means, a support, a ratchet wheel rotatably mounted on said support and arranged and constructed to move said driven means from one position to another, indexing means on said support cooperating with said ratchet wheel, spring means interposed between said support and said indexing means for advancing the latter and thereby said ratchet wheel to operate said driven means, cam means cooperating with said indexing means, and means operable conjointly with said cam means for positively advancing said indexing means and said ratchet wheel when insufficient energy is stored in said spring means to effect such advance.

32. A ratchet drive mechanism comprising, in combination, driven means, a support, a ratchet wheel rotatably mounted on said support and arranged and constructed to move said driven means from one position to another, indexing means on said support cooperating with said ratchet wheel, spring means interposed between said support and said indexing means for advancing the latter and thereby said ratchet wheel to operate said driven means, a drive cam rotatably mounted on said support and cooperating with said indexing means to retract it and store energy in said spring means, a booster pawl rotatably mounted on said support and cooperating with said indexing means, a booster cam operable conjointly with said drive cam and cooperating with said booster pawl for positively advancing said indexing means and said ratchet wheel when insufficient energy is stored in said spring means to effect such advance, and a motor operatively connected to said drive cam and said booster cam for rotating them.

33. A ratchet drive mechanism comprising, in combination, driven means, a support, a ratchet wheel rotatably mounted on said support and arranged and constructed to move said driven means from one position to another, indexing means on said support cooperating with said ratchet wheel, spring means interposed between said support and said indexing means for advancing the latter and thereby said ratchet wheel to operate said driven means and for biasing said indexing means away from said ratchet wheel, a drive cam rotatably mounted on said support and cooperating with said indexing means to retract it and store energy in said spring means during a part of its revolution and during another part of its revolution said drive cam acting to move said indexing means into operative relation with said ratchet wheel for operation thereof as aforesaid by said spring means, a motor operatively connected to said drive cam for rotating it, and means driven by said motor and operable after said other part of a revolution of said drive cam has been completed for positively advancing said indexing means and said ratchet wheel when insufficient energy is stored in said spring means to effect such advance by itself.

34. A ratchet drive mechanism comprising, in combination, driven means, a support, a ratchet wheel rotatably mounted on said support and arranged and constructed to move said driven means from one position to another, indexing means on said support cooperating with said ratchet wheel, spring means interposed between said support and said indexing means for advancing the latter and thereby said ratchet wheel to operate said driven means and for biasing said indexing means to retract it and store energy in said spring means during a part of its revolution and during another part of its revolution said drive cam acting to move said indexing means into operative relation with said ratchet wheel for operation thereof as aforesaid by said spring means, a motor operatively connected to said drive cam for rotating it, a booster pawl rotatably mounted on said support and cooperating with said indexing means, and a booster cam driven by said motor and cooperating with said booster pawl after said other part of a revolution of said drive cam has been completed for positively advancing said indexing means and said ratchet wheel when insufficient energy is stored in said spring means acting alone to effect such advance.

35. A ratchet drive mechanism comprising, in combination, driven means, a support, a ratchet wheel rotatably mounted on said support and arranged and constructed to move said driven means from one position to another, indexing means on said support cooperating with said ratchet wheel, spring means interposed between said support and said indexing means for advancing the latter and thereby said ratchet wheel to operate said driven means and for biasing said indexing means away from said ratchet wheel, a drive cam rotatably mounted on said support and cooperating with said indexing means to retract it and store energy in said spring means during a part of its revolution and during another part of its revolution said drive cam acting to move said indexing means into operative relation with said ratchet wheel for operation thereof as aforesaid by said spring means, a motor operatively connected to said drive cam for rotating it, a booster pawl rotatably mounted on said support and cooperating with said indexing means, and a booster cam driven by said motor and cooperating with said booster pawl after said other part of a revolution of said drive cam has been completed for positively advancing said indexing means and said ratchet wheel when insufficient energy is stored in said spring means acting alone to effect such advance, the reaction between said booster pawl and said indexing means being such as to urge the latter into operative engagement with said ratchet wheel.

References Cited in the file of this patent

UNITED STATES PATENTS

| | | |
|---|---|---|
| 1,849,403 | Jefferson | Mar. 15, 1932 |
| 2,483,831 | Illian | Oct. 4, 1949 |
| 2,501,431 | Ausman et al. | Mar. 21, 1950 |
| 2,874,773 | Lorenz | Feb. 24, 1957 |